(12) United States Patent
Montoya et al.

(10) Patent No.: US 12,204,330 B2
(45) Date of Patent: Jan. 21, 2025

(54) APPARATUSES, COMPUTER-IMPLEMENTED METHODS, AND COMPUTER PROGRAM PRODUCTS FOR INTERFACE DECLUTTERING ASSOCIATED WITH VEHICLE OPERATION

(71) Applicant: Honeywell International Inc., Charlotte, NC (US)

(72) Inventors: Roberto Gudino Montoya, Scottsdale, AZ (US); Kelsey Marie Keberle, Tempe, AZ (US); Steven Curtis Crouch, Mesa, AZ (US)

(73) Assignee: Honeywell International Inc., Charlotte, NC (US)

( * ) Notice: Subject to any disclaimer, the term of this patent is extended or adjusted under 35 U.S.C. 154(b) by 307 days.

(21) Appl. No.: 17/658,576

(22) Filed: Apr. 8, 2022

(65) Prior Publication Data
US 2023/0324907 A1  Oct. 12, 2023

(51) Int. Cl.
| | |
|---|---|
| *B60W 50/08* | (2020.01) |
| *B60K 35/00* | (2006.01) |
| *B60Q 1/00* | (2006.01) |
| *B60W 10/08* | (2006.01) |
| *B60W 10/26* | (2006.01) |
| *G05D 1/00* | (2006.01) |
| *B60K 35/10* | (2024.01) |
| *G06F 3/04847* | (2022.01) |

(52) U.S. Cl.
CPC ........... *G05D 1/0044* (2013.01); *B60K 35/00* (2013.01); *B60K 35/10* (2024.01); *B60K 2360/11* (2024.01); *G06F 3/04847* (2013.01)

(58) Field of Classification Search
None
See application file for complete search history.

(56) References Cited

U.S. PATENT DOCUMENTS

| | | | |
|---|---|---|---|
| 11,673,665 B2* | 6/2023 | Enke | B64C 39/024 701/2 |
| 2005/0110621 A1* | 5/2005 | Hahn | B60R 1/30 348/E7.086 |
| 2018/0297470 A1* | 10/2018 | Kim | G08G 1/166 |
| 2020/0216087 A1* | 7/2020 | Kim | B60W 10/196 |

* cited by examiner

*Primary Examiner* — Jonathan M Dager
*Assistant Examiner* — Laura E Linhardt
(74) *Attorney, Agent, or Firm* — Alston & Bird LLP

(57) ABSTRACT

Embodiments of the present disclosure provide improved user interfaces and mechanisms associated with controlling a vehicle. Some such embodiments provide a decluttered user interface that dynamically updates to provide detailed element(s) utilized to convey particular details of vehicle operation and/or adjust operation of the vehicle. Some embodiments cause rendering of an indicator associated with a value tape set to an invisible state, cause visibility of the value tape in response to interaction data, update the value tape upon second interaction data with the indicator, and set at least one value in response to third interaction data with the indicator and set the value tape back to an invisible state. In this regard, in some embodiments the user interface remains operable while simultaneously reducing the number of interface elements required to be rendered at a given time.

20 Claims, 12 Drawing Sheets

APPARATUSES, COMPUTER-IMPLEMENTED METHODS, AND COMPUTER PROGRAM PRODUCTS FOR INTERFACE DECLUTTERING ASSOCIATED WITH VEHICLE OPERATION

TECHNICAL FIELD OF THE DISCLOSURE

Embodiments of the present disclosure generally relate to systems, apparatuses, computer-implemented methods, and computer program products for improved operation of a vehicle, and specifically for providing decluttered user interfaces for controlling operation of a vehicle.

BACKGROUND

During operation of a vehicle, interfaces provided to a user are often provided that indicate various aspects relevant to the vehicle's operation. Often, interfaces are rendered associated with operation of such vehicles that include a plurality of complex elements associated with various individual parameter values.

Applicant has discovered problems with current implementations for displaying vehicle user interfaces. Through applied effort, ingenuity, and innovation, Applicant has solved many of these identified problems by developing solutions embodied in the present disclosure, which are described in detail below.

BRIEF SUMMARY

In one aspect, a computer-implemented method includes causing rendering of an indicator representing an operational parameter associated with a vehicle, the indicator associated with a value tape corresponding to the operational parameter, receiving first interface interaction data that engages the indicator, causing visibility of the value tape associated with the operational parameter in response to receiving the first interface interaction data, where the first interface interaction data is associated with an engagement of the indicator, receiving second interface interaction data, where the interface interaction data is associated with repositioning of the indicator to an updated position, where the second interface interaction data updates a target value associated with the operational parameter based at least in part on the updated position, receiving third interface interaction data, where the third interface interaction data is associated with a terminated engagement of the indicator, causing invisibility of the value tape in response to the third interface interaction data, and setting the target value associated with the operational parameter in response to receiving the third interface interaction data.

In some embodiments, the computer-implemented method further includes updating the value tape based at least in part on the second interface interaction data.

In some embodiments, the computer-implemented method further includes causing operation of the vehicle based at least in part on the first value in response to receiving the third interface interaction data.

In some embodiments, the value tape is oriented vertically and the second interface interaction data repositions the indicator vertically along the value tape.

In some embodiments, the value tape is oriented horizontally and the second interface interaction data repositions the indicator horizontally along the value tape.

In some embodiments, the value tape includes a visual boundary, and the computer-implemented method includes updating the value tape based at least in part on a distance between the indicator and the visual boundary in response to repositioning of the indicator based at least in part on the second interface interaction data.

In some embodiments, the computer-implemented method further includes automatically repositioning the indicator to an initial position associated with the value tape.

In some embodiments, during repositioning of the indicator, the computer-implemented method further includes determining an offset from an initial position associated with the indicator, where the value tape is updated based at least in part on the offset.

In some embodiments, the second interface interaction data repositions the indicator in a first direction to increase the first value associated with the operational parameter, or the second interface interaction data repositions the indicator in a second direction to decrease the first value associated with the operational parameter.

In some embodiments, the indicator is rendered via a display onboard the vehicle, and the first interaction data is received via user interaction with the display onboard the vehicle.

In some embodiments, the indicator is rendered via a display remote from the vehicle.

In some embodiments, the computer-implemented method further includes determining at least one boundary value associated with the vehicle based at least in part on operations data associated with the vehicle, and configuring the value tape based at least in part on the at least one boundary value.

In some embodiments, causing operation of the vehicle based at least in part on the first value in response to receiving the third interface interaction data includes causing activation of a vehicle heading system to redirect the vehicle from a current value associated with the operational parameter to the target value.

In some embodiments, causing operation of the vehicle based at least in part on the first value in response to receiving the third interface interaction data includes causing activation of a vehicle altitude system to alter an altitude of the vehicle from a current value associated with the operational parameter to the target value.

In some embodiments, causing operation of the vehicle based at least in part on the first value in response to receiving the third interface interaction data includes causing activation of a vehicle speed system to alter a speed of the vehicle from a current value associated with the operational parameter to the target value.

In another aspect, an apparatus is provided that includes at least one processor and at least one memory storing instructions that, when executed by the at least one processor, configures the apparatus to perform any one of the example computer-implemented methods described herein.

In yet another aspect, an apparatus is provided that includes means for performing each operation of any one of the example computer-implemented methods described herein.

In some embodiments, a computer program product embodying a non-transitory computer-readable storage medium is provided, the non-transitory computer-readable storage medium including program instructions stored thereon that, when executed by at least one computer, causes the at least one computer to perform any one of the example computer-implemented methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
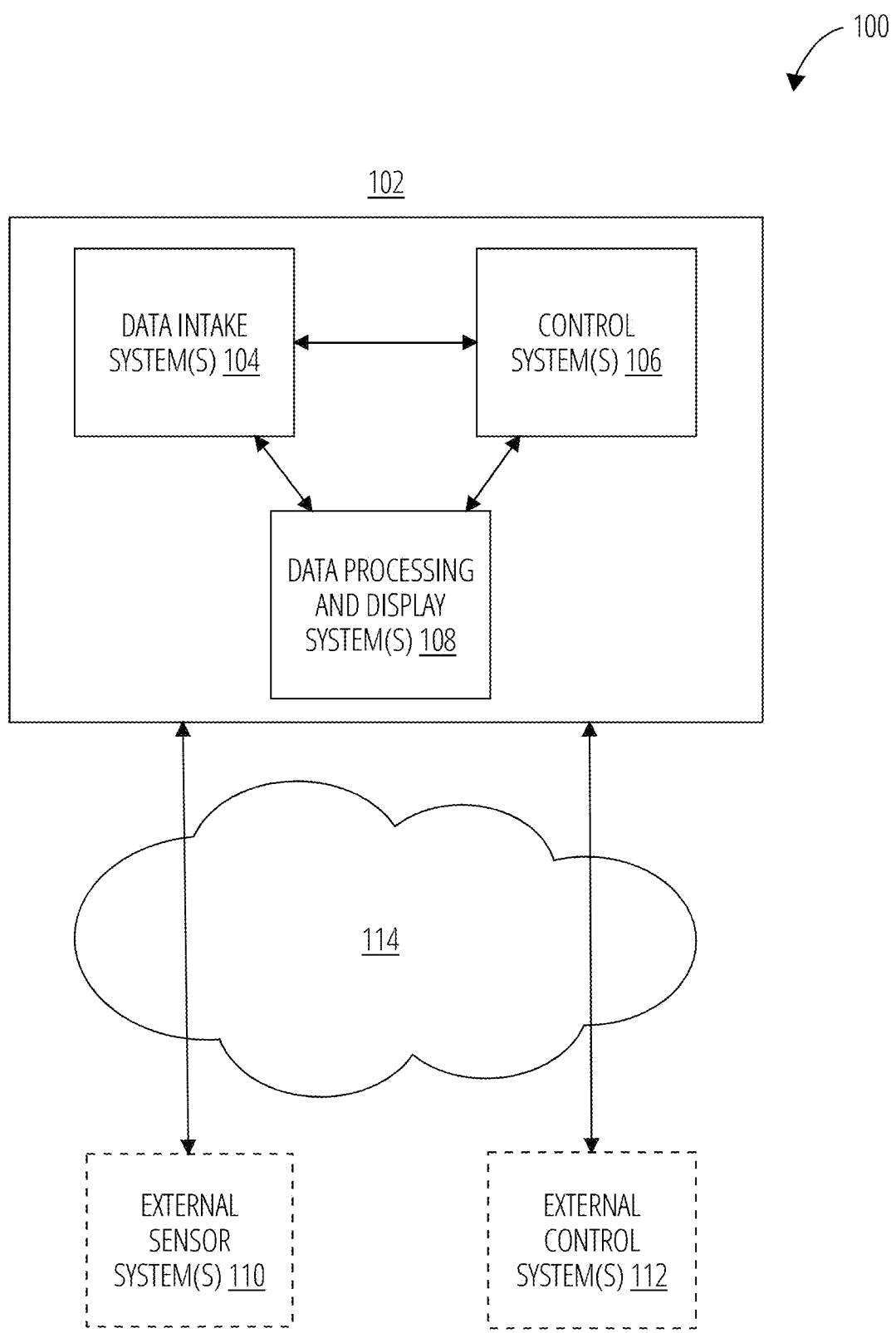
FIG. 1 illustrates a block diagram of an example system in accordance with at least some example embodiments of the present disclosure.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Operation of a vehicle often is complex and challenging. A user operating a vehicle (e.g., an operator, pilot, driver, and/or the like) of a vehicle often is required to monitor various data associated with operation of the vehicle, as well as to utilize various controls that require specialized knowledge to operate the vehicle based on such data. In certain circumstances, such as the use of automated systems for adjusting the operation from the vehicle from a first state to a second state (e.g., speeding up/slowing down, raising/lowering altitude, and/or the like), controls for indicating the new state to which the vehicle should be updated similarly remain complex and/or require specialized knowledge to operate. In various contexts, user interfaces are rendered in an attempt to convey contextual details associated with operation of the vehicle, such as data values, a depiction of one or more environmental aspects, and/or the like. Similarly, in some contexts interface elements are included that include details used by such users for making subsequent decisions regarding operation of the vehicle. For example, in the particular context of aerial vehicle operation, an interface may indicate an aerial vehicle's speed, altitude, heading, acceleration, surroundings, one or more technical readings, and/or the like.

Such user interfaces pose various problems and suffer from various deficiencies. In several contexts, specialized operators of a particular vehicle (e.g., pilots for aerial vehicles, for example) undergo specialized training to understanding such user interfaces and efficiently parse the information within the user interface to make decisions regarding operation of the vehicle. Regardless of such training, such user interfaces often are cluttered due to the amount of information presented to the user at a given time. Additionally, without such specialized training, the interfaces may quickly overwhelm an untrained user and thereby defeat the very purpose for which the user interface is intended (e.g., to convey information). Given a user that has less time and experience with the system, the user may not have sufficient familiarity and/or memory of how the user interface is to be used to operate the vehicle, further defeating the very purpose for which such user interface(s) are intended. Furthermore, once an accurate determination is made by the user and an input is to be provided to adjust operation of the vehicle accordingly, the complexity of modern controls for adjusting operation of a vehicle leaves such controls vulnerable to user error. Such user errors can be detrimental and/or dangerous to the operation of the system and/or the safety of the user. In this regard, within certain contexts such as and without limitation simplified vehicle operation for controlling aerial vehicles by non-pilot operators, such cluttered interfaces and/or complex controls can lead a user to make operational errors when controlling a vehicle. Instead, the inventors have identified that it is desirable for user interfaces to include a reduced number of components, simplify the operation of such components for controlling operation of the vehicle, and thereby enable increased amount of information and control functionality while simultaneously reducing visual clutter. Such user interfaces similarly allow for a streamlined and more readily understandable experience by untrained users (e.g., non-pilots operating simplified aerial vehicles, in one such example context).

Embodiments of the present disclosure include apparatuses, methods, and computer program products for providing improved user interface(s) and/or control(s) used in operating a vehicle. Some embodiments utilize specially configured user interface(s) and user interface element(s) to provide intuitive and decluttered user interfaces. In some embodiments, such user interface(s) may be utilized for controlling a vehicle through one or more interface element(s) rendered to the user interface(s). Particular user interface element(s) that provide intuitive control functions, such as value tape(s), may be utilized that provide control to a user without requiring significant specialized expertise or technical training. The user interface element(s) may change between visible and invisible upon different states in the user's interaction with one or more control(s), for example such that the space taken up by certain control(s) utilized to adjust operation of a vehicle are reduced until certain data is received. In this regard, a control may remain accessible without unnecessarily cluttering the interface when not being interacted with and/or in a state that is not required by a user, and the control and/or associated user interface element(s) may be updated accordingly to take up addition space when such user interface elements become relevant to the user (e.g., to become visible for use in adjusting a value for one or more operational parameters).

Embodiments of the present disclosure provide a novel and improved manner for capturing particular input utilized in controlling or otherwise adjusting operation of a vehicle, as well as improved user interfaces that enable capturing of such input. In this regard, some such embodiments of the present disclosure replace more complex, technical controls that require specialized training and/or knowledge to enable accurate performance by a user (e.g., knob(s), control stick(s), and/or the like). Such more complex controls are replaced in a manner that remains sufficiently intuitive and controllable by relatively or entirely untrained operator(s).

Some embodiments leverage underlying understanding(s) of touch screen interactions that many users untrained for operating a particular vehicle are nevertheless exposed to through operation of other modern day use of technology (e.g., touchscreen smart phones). In this regard, users continue to gain exposure to particular gestures, movements, and/or other interactions usable for performing actions in the embodiments described herein. Additionally or alternatively, by updating the visibility of particular user interface element(s), such user interface(s) may have reduced visual clutter. Such reduced visual clutter provides a myriad of advantages, including saving computing resources that would otherwise be wasted on rendering particular user interface element(s) when they are not needed. Additionally, by reducing visual clutter of a user interface, embodiments of the present disclosure enable provision of user interface(s) that are more intuitively engageable by users with low or no technical training. Such user interface(s) decrease the likelihood of information presented via the user interface overwhelming a given user during operation of a vehicle, and reduce chances of a user improperly operating the vehicle due to being overwhelmed or uninformed from the information displayed therein. In an extreme scenario, such simplified user interfaces and control operations enable an untrained user to nevertheless operate a vehicle quickly, decreasing the chance that the user operates the vehicle in a dangerous manner (e.g., by avoiding a collision with the ground, other vehicles, and/or the like).

Definitions

"Boundary value" refers to a threshold value for a particular operational parameter that a current value must satisfy based on one or more condition(s). An operational parameter may be associated with one or more boundary values, including and without limitation a single boundary value, two boundary values (e.g., a minimum boundary value and maximum boundary value), or a plurality of boundary values.

"Indicator" refers to any user interface component, element, or control renderable to a user interface. Non-limiting examples of an indicator include a button, a label, an image, a video, an animation, a user interface custom control, a user interface simple control, and a gesture-enabled portion of a user interface.

"Invisibility" and "invisible" refer to a state of being undetectable by an operator entity. In contexts where the operator entity is a human, visibility refers to imperceptibility via human sight. In contexts where the operator entity is a computer, invisibility refers to imperceptibility by the computer.

"Operational parameter" refers to a parameter associated with control, operation, and/or other function of a vehicle. Non-limiting examples of an operational parameter include a vehicle speed, a vehicle heading, a vehicle altitude, and a vehicle component setting or orientation.

"Target value" refers to electronically managed data that indicates a value to which an operational parameter is to be changed via operation of a vehicle. For example, a speed operational parameter may be set to a target value that represents a new speed that a vehicle is to reach by decelerating or accelerating.

"Interface interaction data" refers to electronically managed data indicating a gesture, input, or other interaction initiating or otherwise associated with an engagement of a rendered user interface. Non-limiting examples of interface interaction data include touch interaction data that indicates initiation of an engagement of a touch, indicates a movement of a touch (e.g., by dragging), and/or indicates a termination of the touch, gesture interaction data that indicates initiation of an engagement of a gesture, indicates a movement of a gesture, and/or indicates release of a gesture, and/or peripheral interaction data that indicates initiation of an engagement of a peripheral, indicates continued interaction with a peripheral, and/or termination of interaction with a peripheral. In some contexts, interface interaction data comprises a plurality of portions of interface interaction data, where the portions of interface interaction data represent a beginning or engagement of a continuous touch, movement of the continuous engagement (e.g. and without limitation, a continuous touch, mouse movement, and/or the like) along the rendered user interface, and a termination, end, or release of the continuous engagement.

"User interaction" and "interaction" refers to electronically managed data indicating any action performed by a user that engages a particular user interface, computing device(s), and/or system(s). Non-limiting examples of a user interaction includes touch data, gesture data, voice command data, computer vision data, peripheral input data, mouse input data, keyboard input data, and/or updates in prior data indicating engagement.

"Value tape" refers to an indicator associated with a particular operational parameter that depicts a range of possible settable values associated with the particular operational parameter, where a particular value is selectable via one or more interactions associated with the indicator or an associated indicator.

"Vehicle" refers to any moveable apparatus, machine, or other combination of components. Non-limiting examples of a vehicle include an aerial vehicle, an unmanned vehicle, a remote controlled vehicle, an automobile, a boat, a helicopter, and an urban mobility vehicle.

"Vehicle altitude system" refers to one or more computing device(s) embodied in hardware, software, firmware, and/or any combination thereof, that controls the altitude of a particular vehicle. In some embodiments, a vehicle altitude system includes an automated system for adjusting one or more operational parameter(s) associated with altitude from a first value (e.g., representing a first state) to a second value (e.g., representing a second state).

"Vehicle heading system" refers to one or more computing device(s) embodied in hardware, software, firmware, and/or any combination thereof, that controls a heading of a particular vehicle. In some embodiments, a vehicle heading system includes an automated system for adjusting one or more operational parameter(s) associated with heading from a first value (e.g., representing a first state) to a second value (e.g., representing a second state).

"Vehicle speed system" refers to one or more computing device(s) embodied in hardware, software, firmware, and/or any combination thereof, that controls a speed of a particular vehicle. In some embodiments, a vehicle speed system includes an automated system for adjusting one or more operational parameter(s) associated with speed from a first value (e.g., representing a first state) to a second value (e.g., representing a second state).

"Visibility" and "visible" refer to a state of being detectable by an operator entity. In contexts where the operator entity is a human, visibility refers to perceptibility via human sight. In contexts where the operator entity is a computer, visibility refers to perceptibility by the computer.

"Visual boundary" refers to visually depicted interface element(s) associated with a value tape that indicate(s) a boundary value associated with at least one operational parameter corresponding to that value tape.

Example Systems and Apparatuses of the Disclosure

FIG. 1 illustrates a block diagram of an example system in accordance with at least some example embodiments of the present disclosure. Specifically, FIG. 1 depicts an example system 100 configured to enable provisions of improved user interfaces associated with operation of a vehicle, such as the vehicle 102. The system 100 includes a vehicle 102, external sensor system(s) 110, and external control system(s) 112. In some embodiments, the vehicle 102, external sensor system(s) 110, and external control system(s) 112 are communicable with one another over one or more network(s), for example the communications network 114.

The vehicle 102 includes one or more computing device(s) embodied in hardware, software, firmware, and/or a combination thereof, that provides one or more user interface(s) associated with operation of the vehicle. In some embodiments, the vehicle 102 embodies any of a myriad of specially configured and moveable device(s), machine(s), and/or the like. For example, in some embodiments, the vehicle 102 embodies an automobile, a boat, an airborne vehicle, and/or the like. In one example context, the vehicle 102 embodies a simplified aerial vehicle or a remote controlled aerial vehicle. In some embodiments, the vehicle 102 is intended to be operated by a user that does not have specialized experience with operating the vehicle, for example a regular user rather than a specially trained pilot. It will be appreciated that the vehicle 102 may include any of a myriad of mechanical and/or digital components that facilitate a physical movement of the vehicle.

In some embodiments, the vehicle 102 optionally includes data intake system(s) 104. In some embodiments, the data intake system(s) 104 includes one or more computing device(s) embodied in hardware, software, firmware, and/or any combination thereof, that collects, intakes, gathers, receives, and/or otherwise identifies data associated with operation of the vehicle 102. In some embodiments, the data intake system(s) 104 includes one or more sensor(s) onboard or communicable with the vehicle 102. Additionally or alternatively, in some embodiments the data intake system(s) 104 includes one or more device(s) communicable with an external system that provides data to the vehicle 102 for processing. In some embodiments, the data intake system(s) 104 intakes data associated with one or more system(s) of the vehicle 102 that control or otherwise are associated with an aspect of the operation of the vehicle 102.

In some embodiments, the vehicle 102 is communicable with external sensor system(s) 110 that provide data to the vehicle 102. For example, in some embodiments, the external sensor system(s) 110 includes one or more device(s) embodied in hardware, software, firmware, and/or any combination thereof, that monitor one or more aspect(s) of the vehicle 102 itself, and/or its environment. In some embodiments, the vehicle 102 receives data transmission(s) embodying the data collected via the external sensor system(s) 110, for example via a communication link established and/or maintained with the data intake system(s) 104 onboard the vehicle 102. In some embodiments, the external sensor system(s) 110 includes a client device communicable with the vehicle 102, and/or a plurality of system(s) external to the vehicle 102. In some embodiments, the external sensor system(s) 110 entirely replace the data intake system(s) 104.

In some embodiments, the vehicle 102 optionally includes control system(s) 106. In some embodiments, the vehicle 102 includes one or more computing device(s) embodied in hardware, software, firmware, and/or any combination thereof, that facilitates one or more operation(s) that controls the vehicle 102. In some embodiments, the control system(s) 106 manipulates one or more component(s) of the vehicle 102 to facilitate adjustment a current value of an operational parameter to a target value. In some embodiments, the control system(s) 106 includes a vehicle speed system, a vehicle heading system, and/or a vehicle altitude system. In the context of an aerial vehicle, for example, the control system(s) 106 in some embodiments controls engine(s), turbine(s), mechanical rotor(s), and/or other components for altering a speed, altitude, or heading during operation of the vehicle 102. In some embodiments, the control system(s) 106 receives adjusted value(s) for one or more operational parameter(s) as described herein (e.g., utilizing one or more of the user interfaces described herein), and automatically facilitates the adjustment of the value utilizing one or more physical component(s) of the vehicle 102. In other embodiments, the control system(s) 106 facilitates manual control of one or more components to cause adjustment of the value for one or more operational parameter(s).

In some embodiments, the vehicle 102 is communicable with external control system(s) 112 that controls the vehicle 102 from a location external to the vehicle 102. For example, in some embodiments, the external control system(s) 112 includes one or more device(s) embodied in hardware, software, firmware, and/or any combination thereof, that transmits control instruction(s) to the vehicle 102 that cause vehicle 102 physical adjustment(s) of one or more component(s) of the vehicle 102, resulting in operational changes to the vehicle 102. In some embodiments, the vehicle 102 receives data transmission(s) embodying the controls transmitted from the external control system(s) 112, for example via a communication link established and/or maintained with the control system(s) 106 onboard the vehicle 102. In some embodiments, the external control system(s) 112 includes a client device communicable with the vehicle 102, and/or a plurality of system(s) external to the vehicle 102. In some embodiments, the external control system(s) 112 entirely replaces the control system(s) 106.

In some embodiments, the vehicle 102 includes data processing and display system(s) 108. In some embodiments, the data processing and display system(s) 108 includes computing device(s) embodied in hardware, software, firmware, and/or any combination, that facilitate generation and/or use of one or more user interface(s). In some embodiments, the data processing and display system(s) 108 includes one or more display(s) visible to user(s) of the vehicle 102. The display(s) may be onboard the vehicle 102 or in some cases associated with client devices remote from the vehicle 102 itself. For example, in some embodiments the display(s) include a primary flight display (PFD), one or more multi-function display(s), and/or the like. In some embodiments, the display(s) include a heads up display or touchscreen interface of a ground vehicle (e.g., an automobile). In some embodiments, the data processing and display system(s) 108 is specially configured to generate particular user interface(s), process data received via the user interface(s), and/or update user interface(s) in response to received data (e.g., user input). In some embodiments, the data processing and display system(s) 108 is entirely onboard the vehicle 102. In some embodiments, some or all of the data processing and display system(s) 108 is embodied by separate device(s) and/or system(s), for example embodied by a client device associated with the vehicle 102.

The communications network 114 includes any number of computing device(s) embodied in hardware, software, firmware, and/or a combination thereof, that enables transmission of data to and/or from one or more other device(s) connected thereto. For example, in some embodiments and as depicted, the communications network 114 enables transmission of data between the vehicle 102 and one or more of the external control system(s) 112 and/or external sensor system(s) 110. Additionally or alternatively, in some embodiments the communications network 114 enables transmission of data between the external control system(s) 112 and/or external sensor system(s) 110 and a client device associated with operation of the vehicle 102. Additionally or alternatively still, in some embodiments, the communications network 114 enables transmission of data between the external sensor system(s) 110 and external control system(s) 112.

The communications network 114 may embody any of a myriad of network configurations. In some embodiments, the communications network 114 embodies a public network (e.g., the Internet). In some embodiments, the communications network 114 embodies a private network (e.g., an internal network between particular devices). In some other embodiments, the communications network 114 embodies a hybrid network (e.g., a network enabling internal communications between particular connected devices and external communications with other devices). The communications network 114 may include one or more base station(s), relay(s), router(s), switch(es), cell tower(s), communications cable(s) and/or associated routing station(s), and/or the like. In some embodiments, the communications network 114 includes one or more user controlled computing device(s) (e.g., a user owner router and/or modem) and/or one or more external utility devices (e.g., Internet service provider communication tower(s) and/or other device(s)).

Figure 2:
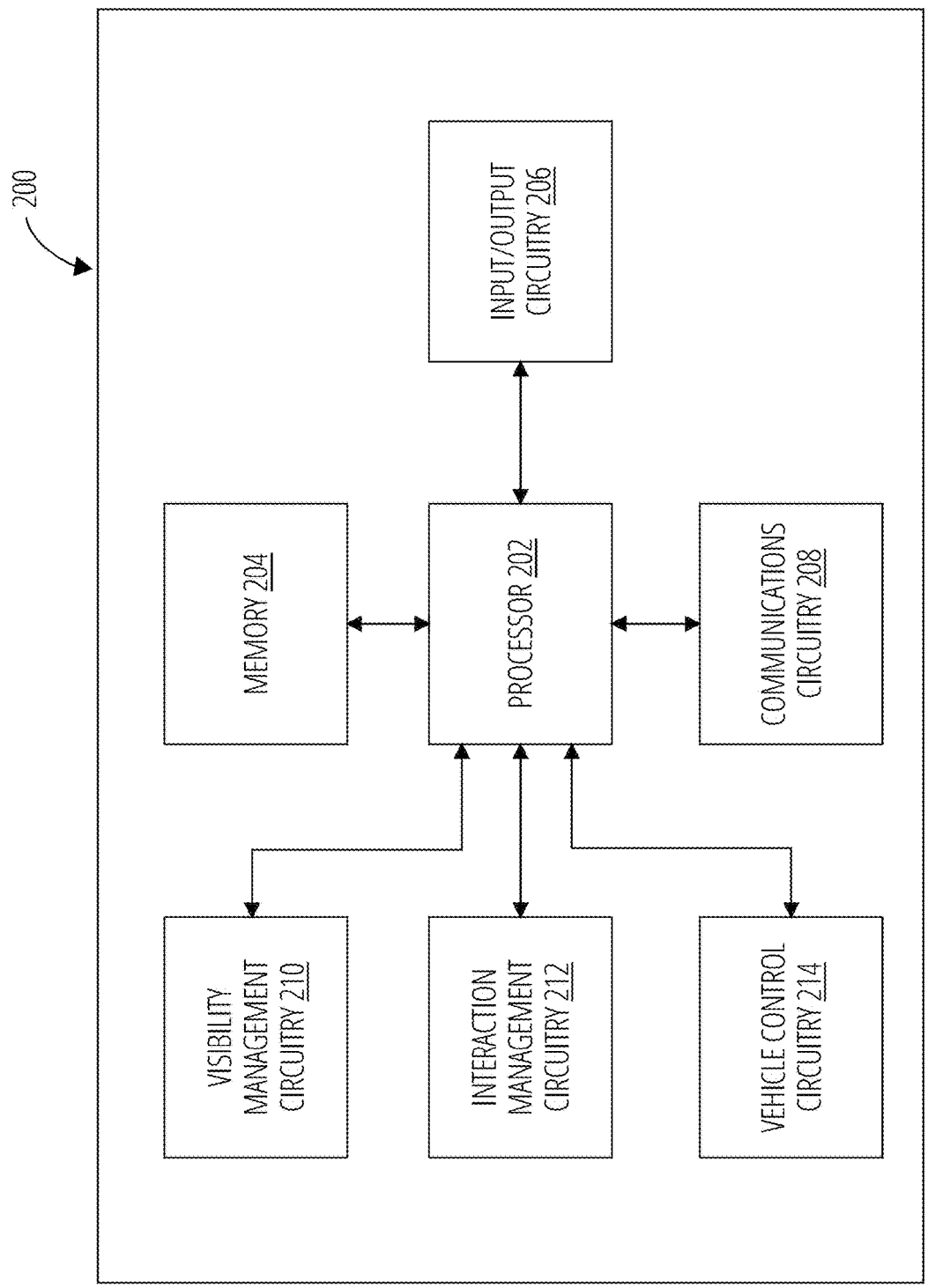
FIG. 2 illustrates a block diagram of an example apparatus in accordance with at least some example embodiments of the present disclosure.

FIG. 2 illustrates a block diagram of an example apparatus in accordance with at least some example embodiments of the present disclosure. In some embodiments, the vehicle 102 and/or one or more subsystems thereof, for example the data intake system(s) 104, the control system(s) 106, and/or the data processing and display system(s) 108 is embodied by one or more computing system(s), such as the vehicle interfacing apparatus 200 depicted and described in FIG. 2. The vehicle interfacing apparatus 200 includes processor 202, memory 204, input/output circuitry 206, communications circuitry 208, visibility management circuitry 210, interaction management circuitry 212, and vehicle control circuitry 214. In some embodiments, the vehicle interfacing apparatus 200 is configured, using one or more of the sets of circuitry 202, 204, 206, 208, 210, 212, and/or 214, to execute the operations described herein.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the vehicle interfacing apparatus 200 provide or supplement the functionality of other particular sets of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the vehicle interfacing apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the vehicle interfacing apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the vehicle interfacing apparatus 200, and/or one or more remote or "cloud" processor(s) external to the vehicle interfacing apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with providing improved user interface(s) associated with monitoring and/or controlling operation of a vehicle, for example as described with respect to operation of the vehicle 102, components thereof (e.g., the data intake system(s) 104, control system(s) 106, data processing and display system(s) 108, and/or the like), and/or as described further herein. In some embodiments, the processor 202 includes hardware, software, firmware, and/or a combination thereof, that receives and/or retrieves operational data associated with a vehicle. Additionally or alternatively, in some embodiments, the processor 202 includes hardware, software, firmware, and/or a combination thereof, that generates and/or causes rendering of specially-configured user interface(s) and/or particular user interface component(s) thereof. Additionally or alternatively, in some embodiments, the processor 202 includes hardware, software, firmware, and/or a combination thereof, that processes interaction data associated with the user interface(s). Additionally or alternatively, in some embodiments, the processor 202 includes hardware, software, firmware, and/or a combination thereof, that reconfigures one or more interface element(s), for example in response to user interaction with the user interface(s). Additionally or alternatively, in some embodiments, the processor 202 includes hardware, software, firmware, and/or a combination thereof, that controls operation of a vehicle based at least in part on interaction with one or more user interface(s).

In some embodiments, the vehicle interfacing apparatus 200 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

The communications circuitry 208 includes any means such as a device or circuitry embodied in either hardware or a combination of hardware and software that is configured to receive and/or transmit data from/to a network and/or any other device, circuitry, or module in communication with the vehicle interfacing apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the vehicle interfacing apparatus 200. In some embodiments, the communications circuitry 208 is entirely optional, for example where the vehicle interfacing apparatus 200 is not connected to or otherwise does not communicate with external system(s) during operation.

The visibility management circuitry 210 includes hardware, software, firmware, and/or a combination thereof, that supports various functionality associated with reconfiguring visibility of user interface element(s) rendered via one or more user interface(s). For example, in some embodiments, the visibility management circuitry 210 includes hardware, software, firmware, and/or a combination thereof, that sets a visibility value for one or more user interface element(s) of a user interface. Additionally or alternatively, in some embodiments, the visibility management circuitry 210 includes hardware, software, firmware, and/or a combination thereof, that monitors one or more user interface(s) for particular interaction(s), and sets visibility of one or more user interface element(s) (e.g., a value tape, an associated indicator, and/or the like) in response to such interaction(s). Additionally or alternatively still, in some embodiments, the visibility management circuitry 210 includes hardware, software, firmware, and/or a combination thereof, that causes re-rendering of one or more user interface(s) with updated configured user interface element(s), for example having updated visibilities. It should be appreciated that, in some embodiments, visibility management circuitry 210 may include a separate processor, specially configured field programmable gate array (FPGA), or a specially programmed application specific integrated circuit (ASIC).

The interaction management circuitry 212 includes hardware, software, firmware, and/or a combination thereof, that supports various functionality associated with processing interaction(s) with one or more user interface(s). For example, in some embodiments, the interaction management circuitry 212 includes hardware, software, firmware, and/or a combination thereof, that receives interaction with one or more specially configured user interface element(s) of a user interface, for example one or more indicator(s) associated with one or more value tape(s). Additionally or alternatively, in some embodiments, the interaction management circuitry 212 includes hardware, software, firmware, and/or a combination thereof, that processes received interaction(s) and initiates one or more process(es) based at least in part on such interaction(s). Additionally or alternatively, in some embodiments, the interaction management circuitry 212 includes hardware, software, firmware, and/or a combination thereof, that updates one or more value(s) associated with one or more user interface element(s) in response to interaction(s). Additionally or alternatively, in some embodiments, the interaction management circuitry 212 includes hardware, software, firmware, and/or a combination thereof, that detects updates in interaction(s), termination of an interaction, and/or initiation of an interaction with a particular user interface element. Additionally or alternatively, in some embodiments, the interaction management circuitry 212 includes hardware, software, firmware, and/or a combination thereof, that sets one or more target value(s) associated with an operational parameter for a particular vehicle. It should be appreciated that, in some embodiments, interaction management circuitry 212 may include a separate processor, specially configured field programmable gate array (FPGA), or a specially programmed application specific integrated circuit (ASIC).

The vehicle control circuitry 214 includes hardware, software, firmware, and/or a combination thereof, that supports various functionality associated with controlling operation a vehicle. For example, in some embodiments, the vehicle control circuitry 214 includes hardware, software, firmware, and/or a combination thereof, that controls one or more system(s) and/or component(s) that effect movement of the vehicle, such as an engine, motor, flap, rotor, braking system, and/or the like, that effectuates a change in vehicle speed, direction, altitude, and/or the like. Additionally or alternatively, in some embodiments, the vehicle control circuitry 214 includes hardware, software, firmware, and/or any combination thereof, that sets a target value for an operational parameter in response to particular interaction with a user interface. Additionally or alternatively, in some embodiments, the vehicle control circuitry 214 includes hardware, software, firmware, and/or any combination thereof, that activates one or more component(s) and/or system(s) to effectuate an adjustment from a current value associated with an operational parameter towards a target value for the operational parameter. It should be appreciated that, in some embodiments, vehicle control circuitry 214 may include a separate processor, specially configured field programmable gate array (FPGA), or a specially programmed application specific integrated circuit (ASIC).

Additionally or alternatively, in some embodiments, one or more of the sets of circuitries 202-214 are combinable. Alternatively or additionally, in some embodiments, one or more of the sets of circuitry perform some or all of the functionality described associated with another component. For example, in some embodiments, one or more of the sets of circuitry 202-214 are combined into a single module embodied in hardware, software, firmware, and/or a combination thereof. Similarly, in some embodiments, one or more of the sets of circuitry, for example, visibility management circuitry 210, interaction management circuitry 212, and/or vehicle control circuitry 214 is combined such that the processor 202 performs one or more of the operations described above with respect to each of these modules.

Example User Interfaces of the Disclosure

Having described example systems and apparatuses in accordance with the present disclosure, example user interfaces will now be described. In some embodiments, the example user interfaces are rendered via one or more display(s), for example a display of a vehicle and/or an associated device (e.g., a client device). The display(s) may be visible to and/or interactable by a particular user, for example such that the user may view the depicted user interface element(s) and interact with one or more of the user interface element(s) to initiate changes to operation of a particular vehicle. In some embodiments, the example user interfaces depicted and described herein are generated by, maintained by, and/or presented via, the vehicle interfacing apparatus 200 as depicted and described herein with respect to FIG. 2. In some embodiments, the vehicle interfacing apparatus 200 embodies all or at least a subsystem of the particular vehicle, for example where such user interfaces are rendered to a display onboard the vehicle 102 and/or an associated client device for viewing and/or controlling the vehicles 102.

Figure 3:
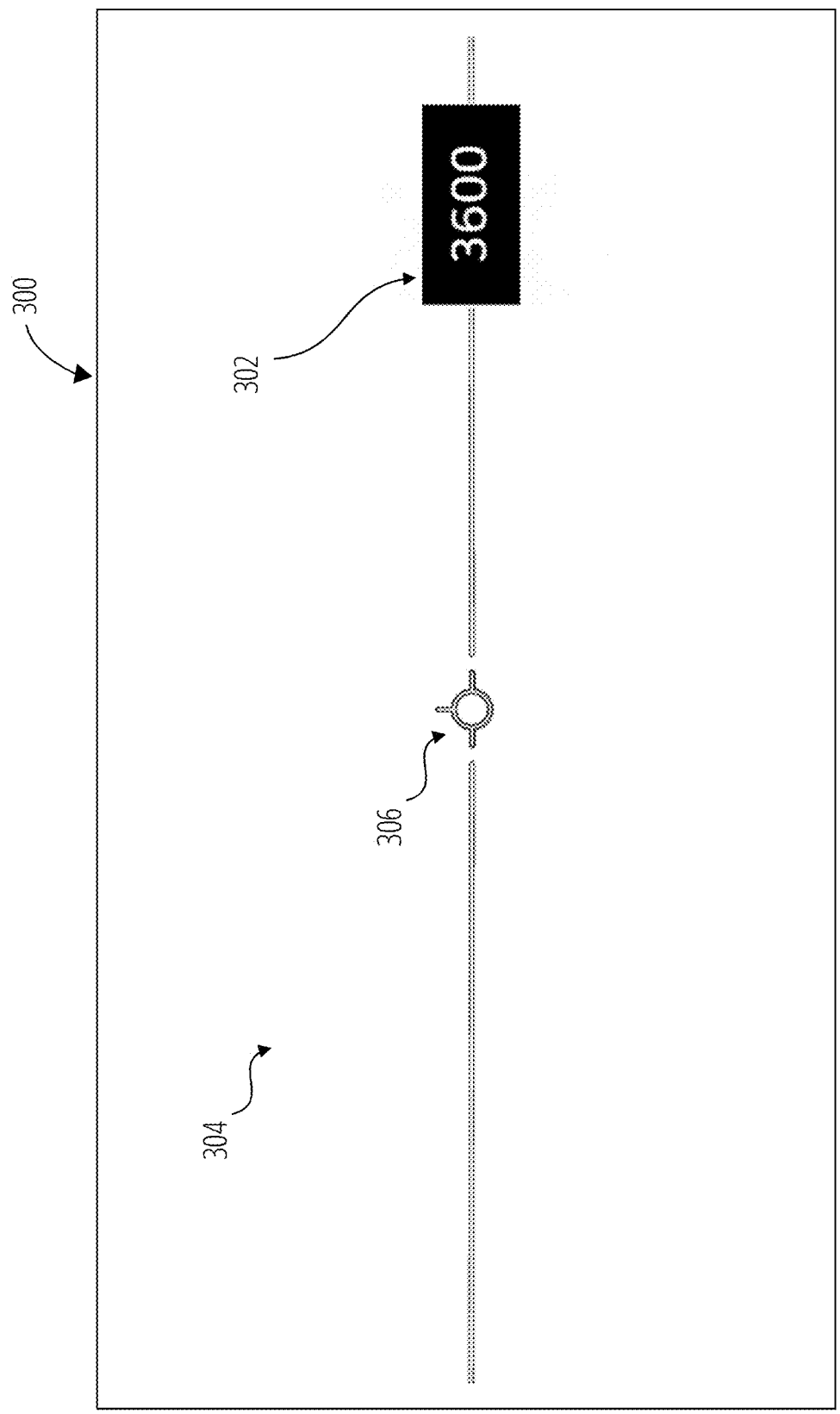
FIG. 3 illustrates an example interface with reduced visual clutter in accordance with at least some example embodiments of the present disclosure.

FIG. 3 illustrates an example interface with reduced visual clutter in accordance with at least some example embodiments of the present disclosure. Specifically, FIG. 3 illustrates an example user interface 300. The user interface 300 is presented with reduced visual clutter to maximize the renderable area available for other elements of the user interface, conserve computing resources that would otherwise be wasted in rendering unnecessary user interface element(s), and reduce the cognitive load to the user viewing the user interface 300 while simultaneously providing access to particular functionality that a user may need for intuitively controlling a vehicle. It will be appreciated that for purposes of visual clarity and description, the individual elements of the figures are meant for descriptive purposes only and not meant to limit the scope and spirit of the disclosure herein or the claims appended herewith.

User interface 300 includes a plurality of interface elements that provide insight into operation of a vehicle. As illustrated, the user interface 300 includes an environment representation 304. In some embodiments, the environment representation 304 embodies a captured image representation, a virtual reconstruction, or other embodiment of at least a portion of the environment surrounding the vehicle. In this regard, the environment representation 304 may visualize the environment surrounding a particular vehicle. In some embodiments, the environment representation 304 includes real-time image or video data representing the environment surrounding a vehicle, for example as captured by one or more cameras onboard the vehicle.

User interface 300 further includes a steering visualizer 306. The steering visualizer 306 includes a user interface element that represents the current direction of travel for the particular vehicle. In this regard, the steering visualizer 306 in some embodiments indicates the direction in which the vehicle is travelling within the surrounding environment. The steering visualizer 306 may be indicated as any of a myriad of images, shapes, icons, and/or the like, for example as a circle or dot positioned in the middle of the environment representation 304 and/or the user interface 300 generally.

In some embodiments, the user interface 300 includes one or more user interface element(s) associated with operational parameters of a vehicle. For example, as illustrated, the user interface 300 includes indicator 302. The indicator 302 embodies a boxed label element that indicates a current altitude of the vehicle, for example embodied by a current value for an altitude operational parameter. In some embodiments, the text of the indicator 302 updates automatically to match a current value for a corresponding operational parameter. In this regard for example, as the current value for the altitude operational parameter associated with the vehicle increases and/or decrease, the indicator 302 may be automatically updated to reflect the corresponding current value. In some embodiments, the current value for the operational parameter corresponding to the indicator 302 is read or otherwise determined via one or more sensor(s) onboard the vehicle. In other embodiments, the current value for an operational parameter is determined, received, retrieved, and/or otherwise identified via another component of the vehicle interfacing apparatus 200, for example the interaction management circuitry 212 and/or vehicle control circuitry 214.

Figure 4:
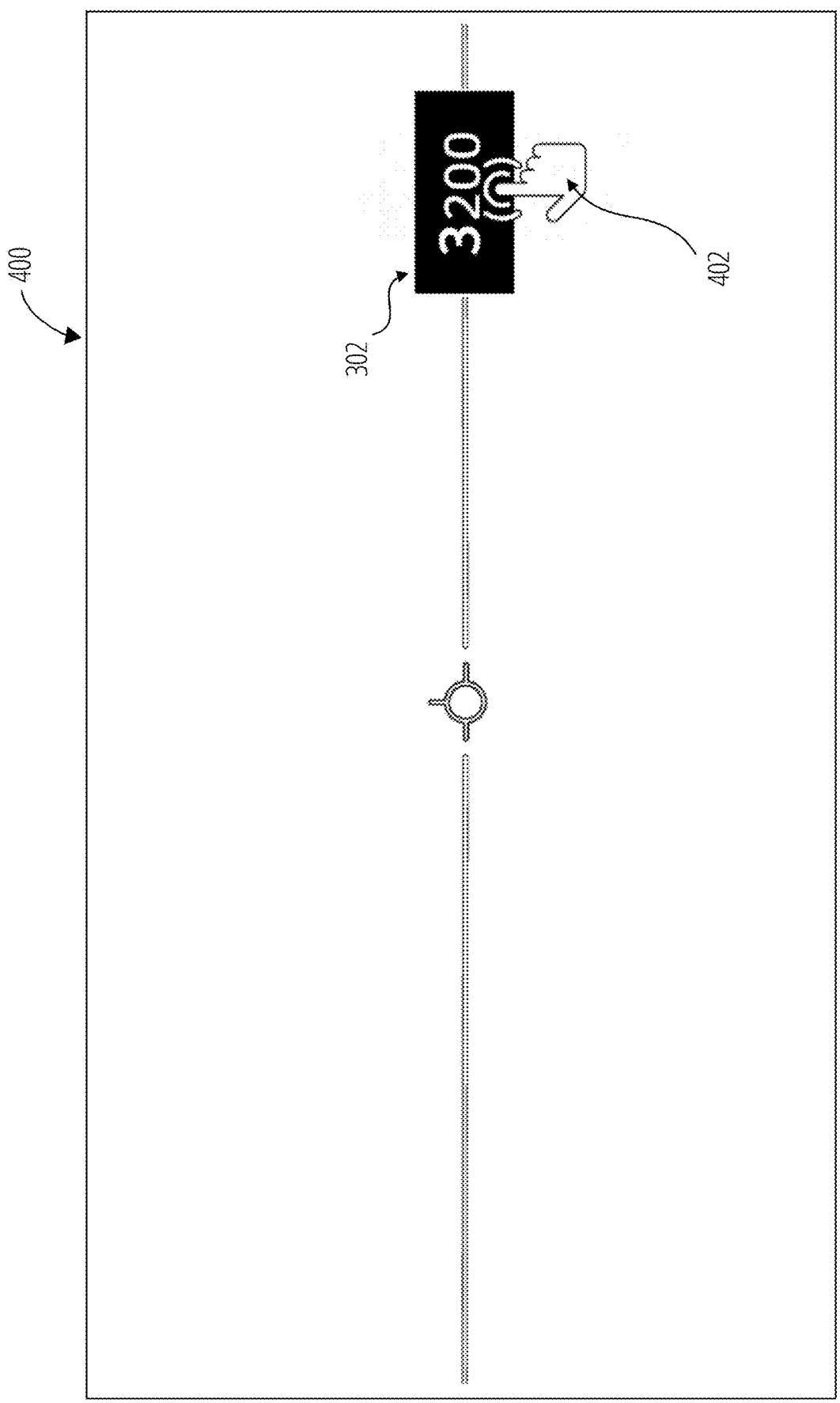
FIG. 4 illustrates an example interaction with an interface in accordance with at least some example embodiments of the present disclosure.

In some embodiments, the indicator 302 is engageable to trigger one or more process(es) for controlling the vehicle associated therewith. In some embodiments, the indicator 302 is configured to receive interaction(s) for controlling an altitude of the vehicle, for example via a vehicle altitude system. FIG. 4 illustrates an example interaction with an interface in accordance with at least some example embodiments of the present disclosure. Specifically, FIG. 4 depicts an example user interface 400 comprising the indicator 302 engaged by a user. In some embodiments, the user interface 400 embodies the user interface 300 at one or more subsequent time stamp(s) after rendering.

The user interface 400 receives an interaction 402. The interaction 402 represents an interaction with the indicator 302. In some embodiments, the interaction 402 represents a tap, click, touch, press, or other interaction inputted via the user interface 400 at a location within the boundary of the indicator 302. For example, in some embodiments, the interaction 402 includes or represents interface interaction data indicating that a user began touching or otherwise pressed down on the indicator 302. It will be appreciated that the interaction 402 in some embodiments embodies any of a myriad of other touch-related gesture(s) or action(s), such as a swipe in a particular direction, double tap, and/or the like. In yet other embodiments, the interaction 402 embodies an input that does not require a physical touch by a user, for example a voice command, an eye-tracking gesture, and/or the like.

The interaction 402 is received by the system that manage(s) the user interface 400, for example the vehicle interfacing apparatus 200. Such a system, for example the vehicle interfacing apparatus 200, determines that the interaction 402 indicates a desire to initiate control of an operational parameter corresponding to the indicator 302, for example to control the vehicle in a particular manner. Continuing the example described above, in a circumstance where the indicator 302 corresponds to an altitude operational parameter, in some embodiments the interaction 402 indicates an intent to control an altitude operational parameter, for example to update the altitude of the vehicle associated therewith.

In some embodiments, the interaction 402 initiates one or more process(es) for updating the user interface. For example, in some embodiments, the interaction 402 triggers one or more process(es) that set a new visibility status or value for one or more user interface element(s) of the user interface 400. In some embodiments, for example, the indicator 302 is associated with a corresponding value tape, such that the corresponding value tape is set to a visible state upon an initiation of an interaction (e.g., as indicated by first interface interaction data), and the value tape is set to a second visible state upon termination of the interaction (e.g., as indicated by second interface interaction data).

In some embodiments, the indicator 302 is engageable to trigger one or more process(es) for controlling the vehicle associated therewith. In some embodiments, the indicator 302 is configured to receive interaction(s) for controlling an altitude of the vehicle, for example via a vehicle altitude system. FIG. 4 illustrates an example interaction with an interface in accordance with at least some example embodiments of the present disclosure. Specifically, FIG. 4 depicts an example user interface 400 comprising the indicator 302 engaged by a user. In some embodiments, the user interface 400 embodies the user interface 300 at one or more subsequent time stamp(s) after rendering.

Figure 5:
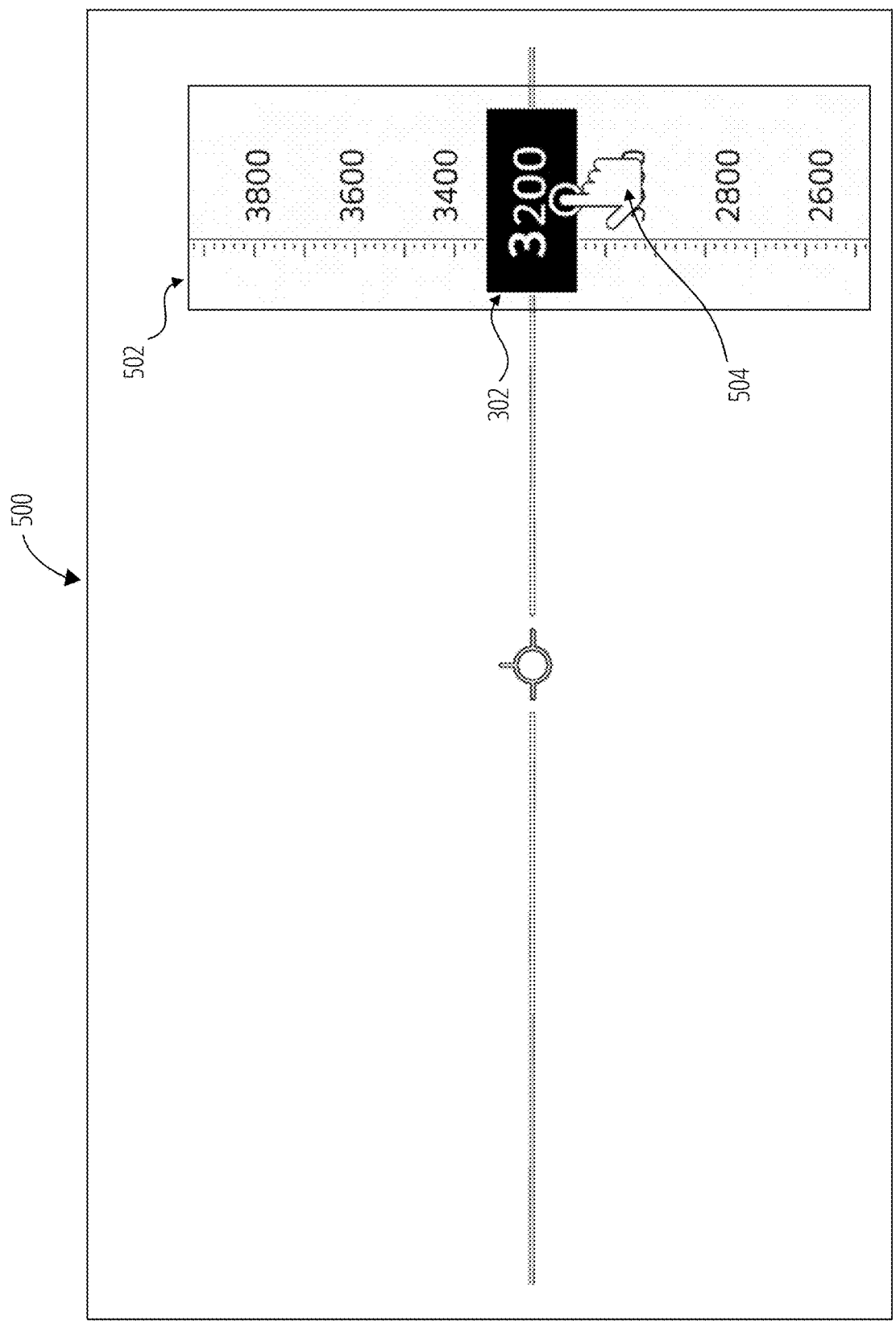
FIG. 5 illustrates an example interface including an example interactable visual tape in accordance with at least some example embodiments of the present disclosure.

FIG. 5 illustrates an example interface including an example interactable visual tape in accordance with at least some example embodiments of the present disclosure. Specifically, FIG. 5 depicts an example user interface 500 comprising a value tape 502 associated with the indicator 302. In some embodiments, the user interface 500 embodies the user interface 400 at one or more subsequent time stamp(s) after an interaction that engages the indicator 302.

As illustrated, the user interface 500 includes a value tape 502 that corresponds to the same operational parameter as the indicator 302. As depicted, the value tape 502 may be a larger visual component that takes up more area of the user interface than the corresponding indicator 302, such that hiding the value tape 502 when it is not required is desirable to conserve computing resources and preserve valuable user interface area (e.g., display space) for other component(s) and/or uses. In some embodiments, the value tape 502 embodies an altitude value tape that represents a myriad of possible altitudes to which the vehicle may be controlled. The value tape 502 may be invisible (e.g., by setting a transparency, de-rendering, or otherwise making unseen to a user) until the user interacts with a corresponding indicator, for example the indicator 302.

In some such embodiments, the indicator 302 functions as a control for setting the visibility of the value tape 502 and/or otherwise interacting with the value tape 502. For example, in some embodiments, the value tape 502 is set to visible upon a first interaction that engages the indicator 302 (e.g., the interaction 402). The interaction 504 in some embodiments embodies a continuing interaction with the indicator 302, for example where the user has pressed on the indicator 302 at the interaction 402 and continues to press on the indicator 302 at interaction 504. In some embodiments, the value tape 502 remains visible during any of a number of second interaction(s) associated with moving, repositioning, and/or otherwise continuing to interact with the value tape 502 via the corresponding indicator 302. Additionally or alternatively, in some embodiments the value tape 502 is set with invisibility upon a subsequent interaction that terminates engagement with the indicator 302, for example by releasing the indicator 302.

Figure 6:
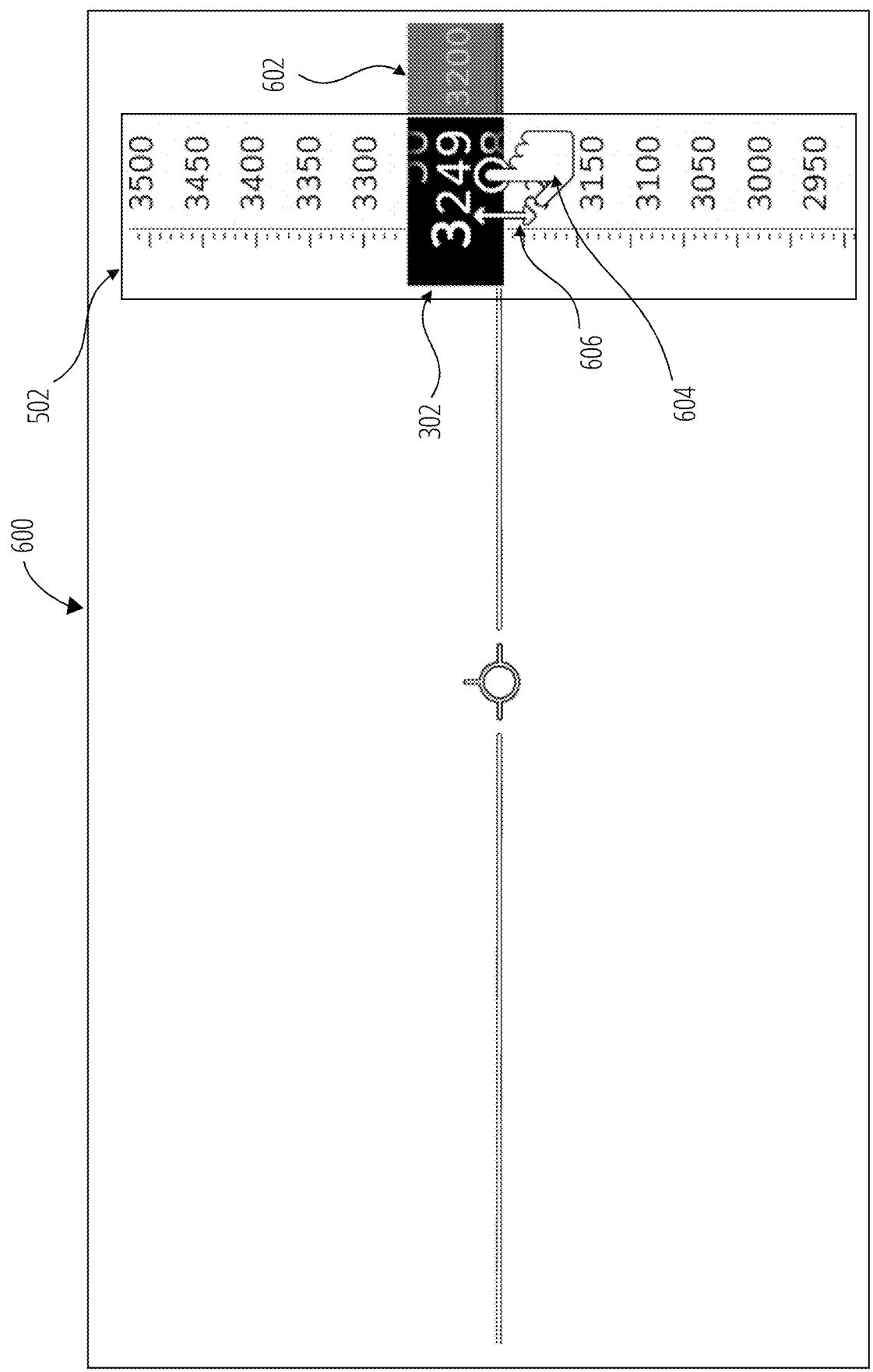
FIG. 6 illustrates an example updating interface including an example interactable visual tape in accordance with at least some example embodiments of the present disclosure.

In some embodiments, the indicator 302 is used as a control to interact with the value tape 502 after receiving interactions 402 and 504. For example, in some embodiments, the indicator 302 in conjunction with the value tape 502 is used to set a new target value for a corresponding operational parameter. FIG. 6 illustrates an example updating interface including an example interactable visual tape in accordance with at least some example embodiments of the present disclosure. Specifically, FIG. 6 depicts an example user interface 600 comprising the indicator 302 interacted with to adjust the corresponding value tape 502. In some embodiments, the user interface 600 embodies the user interface 300 at one or more subsequent time stamp(s) after rendering.

In some embodiments, one or more interaction(s) is/are received to reposition the indicator 302 along the value tape 502. As illustrated, the interaction 604 is received that repositions the indicator 302 to a second position along the value tape 502. In some embodiments, the interaction 604 repositions the indicator 302 vertically along the direction 606. For example, in some embodiments, the indicator 302 is repositioned upwards to adjust a target value associated with the value tape 502 to a higher value, and repositioned downwards to adjust a target value to a lower value. In some embodiments, the interaction 604 represents a drag of the indicator 302 to an updated position, for example upwards on the value tape 502. In some embodiments, the offset of the indicator 302 from an initial position or center position of the value tape 502 corresponds to the rate of change to adjust the target value associated with a corresponding operational parameter. For example, in some embodiments, the greater the offset of the indicator 302 in an upward direction, the greater the rate of change at which the target value increases. Similarly for example, in some embodiments, the greater the offset of the indicator 302 in an downward direction, the greater the rate of change at which the target value decreases.

In some embodiments, the indicator 302 is updated to continuously set a corresponding target value associated with the operational parameter corresponding to the value tape 502. As illustrated, for example, the indicator 302 in some embodiments is manipulated via the interaction 604 to adjust an altitude of a vehicle, for example by setting a new target value associated with an altitude operational parameter via the value tape 502. In some embodiments, as the target value associated with the operational parameter is updated, the indicator 302 is updated to indicate the new target value. For example, in some embodiments, as the target value increases or decreases (e.g., in response to repositioning of the indicator 302) the text of the indicator 302 is updated to represent the newly updated target value. As illustrated, the indicator 302 may be dragged up via interaction 604 to increase the target value from the current value for the operational parameter (e.g., increasing from 3200) to a value of 3249.

In some embodiments, one or more additional interface element(s) are rendered and/or otherwise made visible that indicate the current value for an operational parameter separately from the new target value. For example, as illustrated, the user interface 600 includes current indicator 602 that separately indicates the current value set for the altitude operational parameter (e.g., 3200). In some embodiments, the current indicator 602 is rendered upon receiving a particular interaction or otherwise in response to a particular interaction, for example the interaction 604. In some embodiments, the current indicator 602 is rendered upon receiving an interaction, for example the interaction 604, that repositions the indicator 302 in the direction 606 to cause updating of the current value associated with the corresponding operational parameter. In some embodiments, the current indicator 602 remains visible until a new target value is set for the corresponding operational parameter. Additionally or alternatively, in some embodiments, the current indicator 602 is set to invisible or otherwise de-rendered in circumstances where the new target value is updated to, or set to, the same value as the current value for the operational parameter. In some embodiments, the current indicator 602 is rendered at a dynamic position, for example aligned either horizontally or vertically with the indicator 302 as the indicator 302 is repositioned along the value tape 502. Alternatively or additionally, in some embodiments, the current indicator 602 is rendered at a fixed or otherwise predetermined position. In some embodiments, the current indicator 602 is optional.

Figure 7:
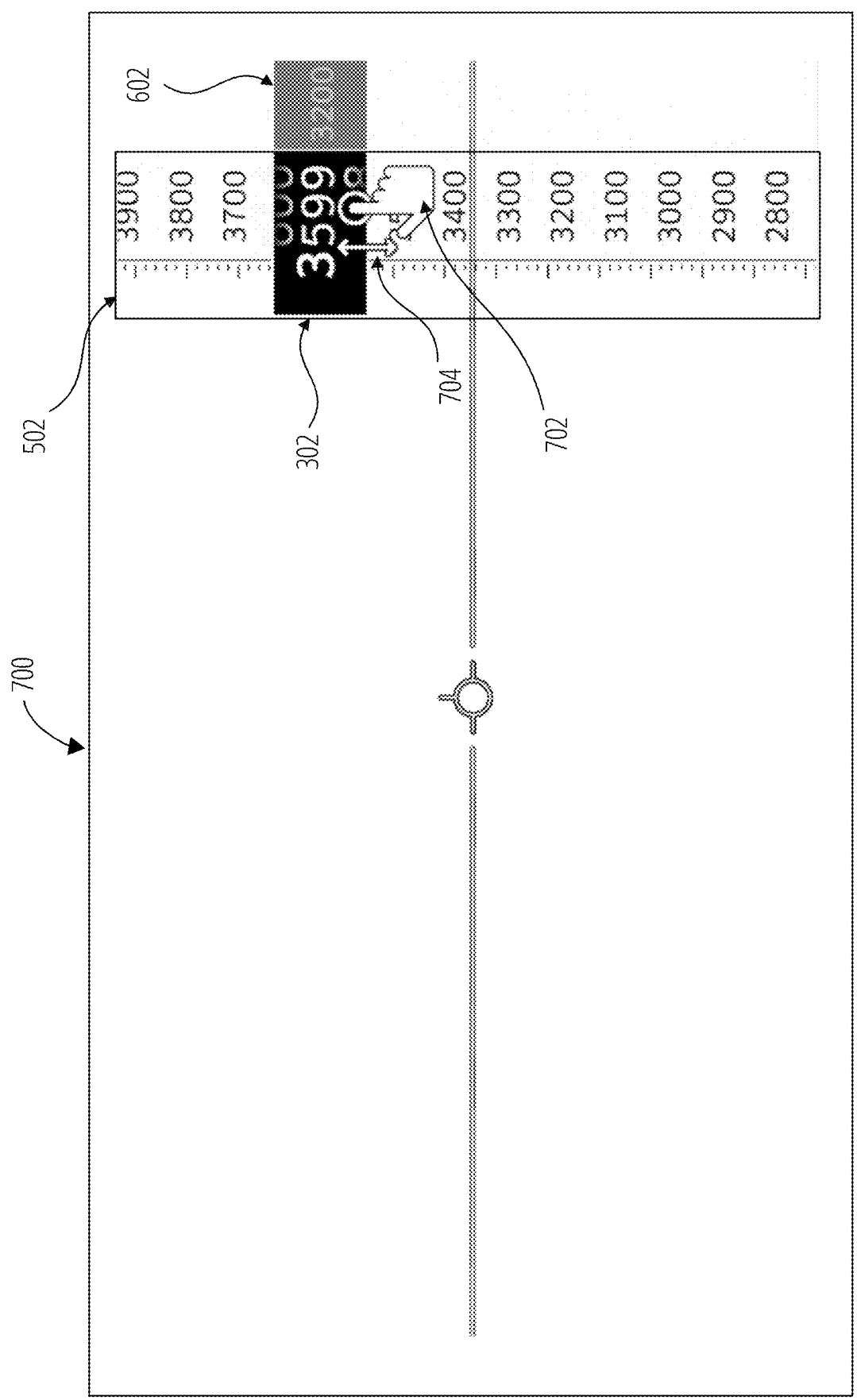
FIG. 7 illustrates another example updating interface including an example interactable visual tape in accordance with at least some example embodiments of the present disclosure.

FIG. 7 illustrates another example updating interface including an example interactable visual tape in accordance with at least some example embodiments of the present disclosure. Specifically, FIG. 7 depicts an example user interface 700 comprising the indicator 302 repositioned to a higher position along the value tape 502. In some embodiments, the user interface 700 at one or more subsequent time stamp(s) after rendering.

In some embodiments, the indicator 302 is repositioned to a second, higher position along the value tape 502 based at least in part on another interaction, for example the interaction 702. In some embodiments, the interaction 702 corresponds to second interface interaction data, for example indicating a continuing drag initiated via interaction 402. The interaction 702 repositions the indicator 302 further in the direction 704, for example upwards to further increase the rate of change in the target value as the indicator 302. For example, in some embodiments, the target value may increase at a first rate (e.g., +10 per second) as the indicator 302 is held at the position depicted in FIG. 6, and increases at a second rate (e.g., +100 per second) as the indicator 302 is held at the position depicted in FIG. 7. As illustrated, the target value is updated to 3599, as depicted in the text of indicator 302 in FIG. 7. It will be appreciated that the rate of change may similarly decrease at the corresponding mirroring positions of the value tape 502, for example flipped over a central axis such that further downward positions correspond to greater decreases in the rate of change for the target value. In this regard, the user may continue to interact with the indicator 302 until the target value corresponds to a particular desired value, for example as indicated by the text label of the indicator 302.

In some embodiments, the user performs a third interaction to submit or otherwise set the target value for the operational parameter. For example, in some embodiments, third interface interaction data is received that indicates a termination of a continuous touch of the indicator 302 (e.g., a termination of an engagement with the indicator 302, for example by releasing a touch). In this regard, in some such embodiments, when the user drops the indicator 302, the corresponding target value for the operational parameter to a new value is set via the vehicle interfacing apparatus 200. Additionally or alternatively, in some embodiments, the user interface is adjusted in one or more manners that alters the visibility of one or more user interface element(s), and/or that resets one or more user interface element(s) to a default state.

In some embodiments, for example, upon receiving a subsequent interaction (e.g., third interface interaction data) indicating a termination of an engagement of the indicator 302 (e.g., releasing a touch), the user interface 700 is updated to de-render or otherwise make invisible one or more user interface element(s) that no longer provide useful context to the user. For example, in some embodiments, the user interface 700 is updated to de-render the value tape 502 or otherwise make the value tape 502 invisible. In some embodiments, the indicator 302 continues to update as the current value for the operational parameter associated with the indicator 302 is updated towards the newly set target value. Alternatively or additionally, in some embodiments, the indicator 302 is rendered together with the current indicator 602, as the current indicator 602 continues to update as the current value for the operational parameter associated with the indicator 302 is updated towards the newly set target value. In some such embodiments, the current indicator 602 is de-rendered or otherwise made invisible once the current value reaches the newly set target value for the operational parameter. In some such embodiments, upon release of the indicator 302 the current indicator 602 is "faded" out via an animation over a particular time interval until the current indicator 602 is no longer visible. It will be appreciated that, as the operation of the vehicle is adjusting from the current value to the newly set target value, the user may again interact with the indicator 302 to control the vehicle at any given time. In this regard, the value tape 502 may be made invisible while simultaneously leaving reduced user interface element(s) relevant to enable the user to access sufficient information regarding operation of the vehicle as it changes based on the newly set target value. In some embodiments the current indicator 602 is optional.

Additionally or alternatively, in some embodiments, upon receiving the subsequent interaction (e.g., third interface interaction data) indicating a termination of an engagement of the indicator 302, the user interface 700 is updated such that the indicator 302 is repositioned or otherwise "snaps" back to an initial and/or default position. In some embodiments, the indicator 302 resets to a default position assigned to or otherwise associated with the indicator 302 before any interaction with the indicator 302 is received, for example as depicted and described with respect to FIG. 3 and FIG. 4. The default position may correspond to a middle position in horizontal alignment with the value tape 502, and/or may be horizontally aligned with the entirety of the user interface. It will be appreciated that in other embodiments, the indicator 302 may be associated with an alternative position, for example where the value tape is not equal to the entire height of the user interface.

In some embodiments, one or more value tape(s) are made visible via a user interface. For example, in some embodiments, a value tape corresponding to a vehicle speed system is made visible. The value tape corresponding to the vehicle speed system may similarly be associated with a separate indicator, for example that receives interaction(s) that control visibility of the corresponding value tape and/or otherwise is utilized to adjust a value associated with the corresponding value tape. Additionally or alternatively, in some embodiments, a value tape corresponding to a vehicle heading system. The value tape corresponding to the vehicle heading system may similarly be associated with a separate indicator, for example that receives interaction(s) that control visibility of the corresponding value tape and/or otherwise is utilized to adjust a value associated with the corresponding value tape. In some embodiments, one or more of the value tape(s), and/or indicators associated therewith, may be simultaneously presented via a single interface.

Figure 8:
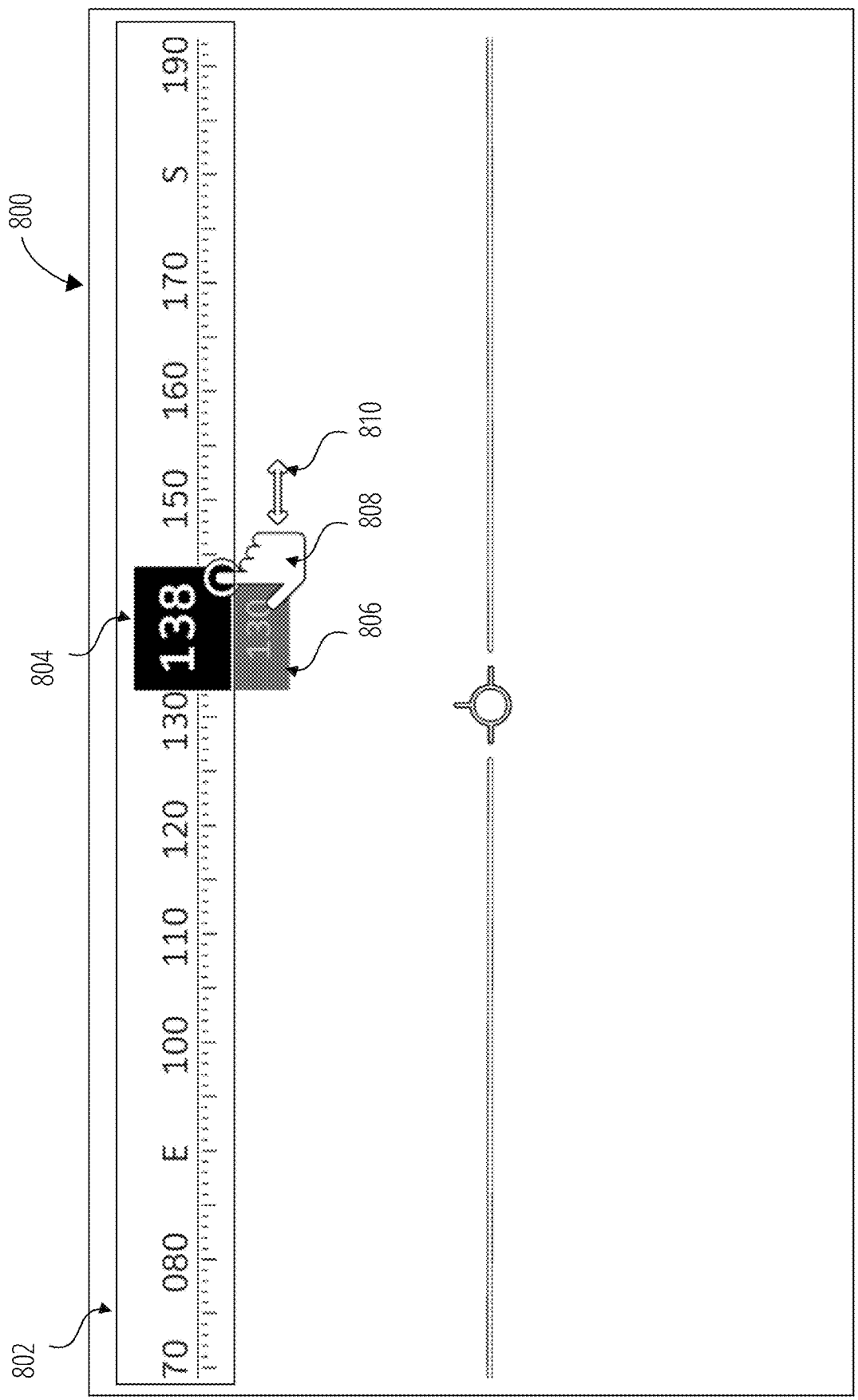
FIG. 8 illustrates another example interface including a horizontal interactable visual tape in accordance with at least some example embodiments of the present disclosure.

In one or more embodiments, one or more value tape(s) and/or associated indicator(s) is/are alternatively configured alternatively from the value tape 502. For example, in some embodiments, the value tape and/or corresponding indicator is displayed oriented differently, and/or enables the indicator to be manipulated in a different direction. FIG. 8 illustrates another example interface including a horizontal interactable visual tape in accordance with at least some example embodiments of the present disclosure. Specifically, FIG. 8 depicts another example user interface 800 including an indicator 804 and value tape 802, each oriented horizontally rather than vertically. In some embodiments, the value tape 802 corresponds to a vehicle heading, such that adjustments corresponding to the value tape 802 are associated with controlling operation of a vehicle heading system. Additionally or alternatively, in some embodiments, the value tape 802 and/or associated indicator 804 is rendered to a user interface together with one or more other value tape(s) and/or associated components, for example value tape 502 and/or associated indicator 302.

In some embodiments, the value tape is associated with values that rollover or otherwise are associated with one another such that the values may be adjusted continuously. In one example context where the value tape 802 corresponds to a vehicle heading, for example, the target value set via the value tape 802 may continuously be rotated at various angles along a circle representing a heading direction. In another example context, a value tape corresponds to a value that does not rollover (e.g., speed, which may be increased or decreased but does not rollover at any point).

In some embodiments, the indicator 804 receives one or more indication(s) that trigger or otherwise are associated with setting visibility of and/or controlling the corresponding value tape 802. For example, in some embodiments, a user performs interaction 808 comprising a first interface interaction data that indicates engagement or selection of the indicator 804, second interface interaction data indicating repositioning the indicator 804 in a second direction 810 (e.g., left or right, where left corresponds to a counterclockwise heading rotation and right corresponds to a clockwise heading rotation), and third interface interaction data terminating the engagement with the indicator 804 and/or otherwise releasing the indicator 804. In this regard, the indicator 804 and corresponding value tape 802 function identically or in a similar manner to the similarly named indicator 302 and value tape 502 as depicted and described in the preceding figures.

The user interface 800 further includes a current indicator 806. The current indicator 806 corresponds to the value tape 802, and is vertically aligned with the corresponding indicator 804. In some embodiments, the current indicator 806 depicts a current value for a particular operational parameter represented by the value tape 802. For example, in some embodiments the current indicator 806 depicts a current value for a vehicle heading defined from a particular origin direction representing a zero degree angle (e.g., corresponding to due North). In some embodiments, the current indicator 806 is set to be visible while the indicator 804 is repositioned to update the target value associated with the value tape 802 to any value differing from the current value associated with the value tape 802, and/or differs from the target value once set. In this regard, in some embodiments, the current indicator 806 functions identically or in a similar manner to the similarly named current indicator 602

Figure 9:
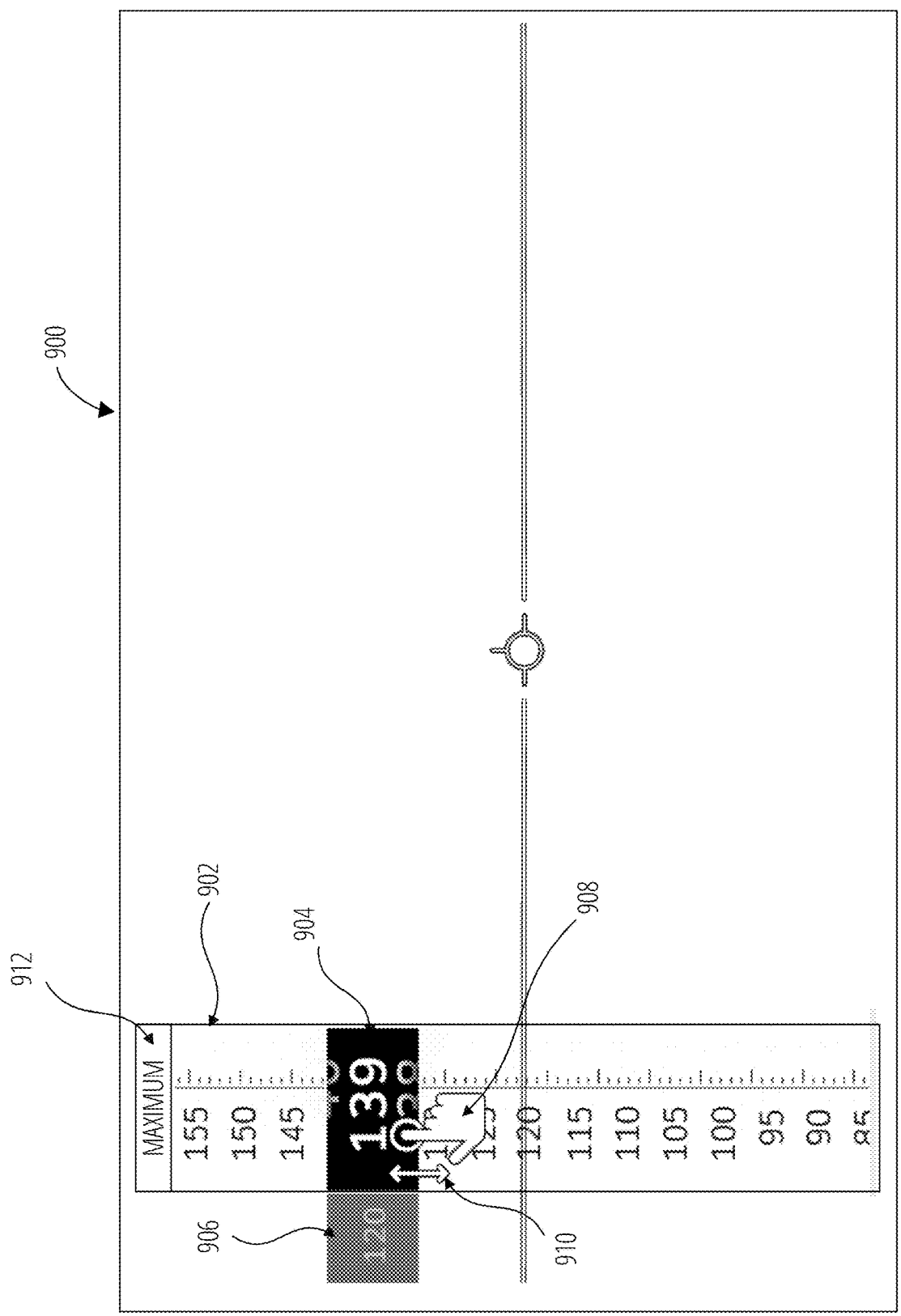
FIG. 9 illustrates another example interface including an additional visual tape in accordance with at least some example embodiments of the present disclosure.

FIG. 9 illustrates another example interface including an additional visual tape in accordance with at least some example embodiments of the present disclosure. Specifically, FIG. 9 depicts another user interface 900 including an indicator 904 and value tape 902, each oriented vertically akin to the corresponding value tape 502 and indicator 302. In one example context, the value tape 902 and indicator 904 are associated with a speed operational parameter, for example to control operation of a vehicle speed system. Additionally or alternatively, in some embodiments, the value tape 902 and/or associated indicator 904 is rendered to a user interface together with one or more other value tape(s) and/or associated components, for example value tape 502 and associated indicator 302 and/or value tape 802 and associated indicator 804.

The user interface 900 includes the value tape 902. In some embodiments, the value tape 902 corresponds to another operational parameter, for example a speed operational parameter. In this regard, the corresponding indicator 904 may be used to adjust and/or set a target value for the corresponding operational parameter. For example, in some embodiments, as the indicator 904 is interacted with via the interaction 908 to reposition the indicator 904 along the value tape 902 in the direction 910. Additionally, user interface 900 includes a current indicator 906. The current indicator 906 corresponds to the same operational parameter as the value tape 902 and indicator 904, for example such that the current indicator 906 indicates a current value for the speed operational parameter. In some embodiments, the current indicator 906 is aligned with the corresponding indicator 904, for example such that repositioning the indicator 904 similarly repositions the current indicator 906. In this regard, in some embodiments the value tape 902, indicator 904, and/or current indicator 906 function in the same or a similar manner to the similarly named elements indicator 302, value tape 502, and/or current indicator 602 in the previously described figures.

In some embodiments, one or more value tapes is associated with one or more boundary value(s). In some embodiments, a boundary value is predetermined or otherwise statically known, for example stored or received (via transmission) by the vehicle interfacing apparatus 200. In some embodiments, a boundary value is determinable in real-time or near-real time based on current operational conditions and/or circumstances associated with the vehicle. For example, in some embodiments, a boundary value is determinable based on one or more current value(s) for one or more operational parameter(s), sensor data associated with the vehicle (e.g., indicating aspect(s) of the environment of the vehicle, and/or data that impact(s) the operation of the vehicle).

In some embodiments, a boundary value is determined based at least in part on data received from a system external to a vehicle, for example including the apparatus 200. In some embodiments, a boundary vehicle is received from an original equipment manufacturer (OEM) system associated with the vehicle. Such boundary values may be pre-determined by the OEM and utilized to configure the apparatus 200, for example, before or after it has been implemented within the vehicle. In some embodiments, the apparatus 200 receives a boundary value from the external OEM system upon updating, upon activation, upon initiating a new trip, and/or the like. Alternatively or additionally, in some embodiments, a boundary value is received from an external regulator system, an external control or instruction system, and/or the like. For example, in the context of air travel, an aerial vehicle may receive a boundary vehicle from an air traffic control system. Alternatively or additionally, in some embodiments, an aerial vehicle receives a boundary value as part of a flight plan or other information inputted or received from an external system as part of a trip to be performed via the aerial vehicle. In some embodiments, an operator and/or user of the vehicle, or other user having access to the apparatus 200 for example, may manually input one or more boundary value(s) for a particular operational parameter. It will be appreciated that different boundary value(s) may be implemented for different operational parameters.

In some embodiments, the boundary value(s) include a minimum value for a particular operational parameter, representing the minimum value that target value for the operational parameter may be set to in a particular circumstance. The minimum value for a particular operational parameter may represent an absolute minimum value, for example representing a minimum possible value in all operational circumstances of a vehicle, or a relative minimum value, for example representing a minimum possible value in a current operational circumstance of a vehicle. Non-limiting examples of a relative minimum value includes a minimum speed that a vehicle may reach based on its current operational parameter values (e.g., current speed, heading, and/or the like), a minimum altitude that may safely be descended to within a particular determinable time interval, a minimum heading that may safely be turned to within a particular determinable time interval, and/or the like. Non-limiting examples of an absolute minimum value includes a minimum speed that a vehicle may reach to operate safely or in all circumstances (e.g., a speed of 0, a minimum speed to continue to stay airborne, and/or the like), a minimum altitude that may be descended to in all circumstances (e.g., a ground altitude), a minimum heading that may be safely turned to based on one or more restriction(s) for operating the vehicle, and/or the like.

In some embodiments, the boundary value(s) include a maximum value for a particular operational parameter, representing the maximum value that target value for the operational parameter may be set to in a particular circumstance. The maximum value for a particular operational parameter may represent an absolute maximum value, for example representing a maximum possible value in all operational circumstances of a vehicle, or a relative minimum value, for example representing a minimum possible value in a current operational circumstance of a vehicle. Non-limiting examples of a relative maximum value includes a maximum speed that a vehicle may reach based on its current operational parameter values (e.g., current speed, heading, and/or the like), a maximum altitude that may safely be ascended to within a particular determinable time interval, a maximum heading that may safely be turned to within a particular determinable time interval, and/or the like. Non-limiting examples of an absolute maximum value includes a maximum speed that a vehicle may reach in all circumstances or to operate safely (e.g., a top speed based on the physical characteristics and/or configuration of the vehicle, a top speed permissible based on one or more regulation(s), and/or the like), a maximum altitude that may be safely ascended to in all circumstances (e.g., a maximum altitude that the vehicle may withstand pressure, a maximum altitude permissible based on one or more regulation(s), and/or the like, a maximum heading that may be turned to based on one or more restriction(s) for operating the vehicle, and/or the like.

In some embodiments, one or more boundary value(s) is depicted via the user interface 900. In some such embodiments, one or more boundary value(s) is depicted via the value tape 902. For example, in some embodiments, the value tape 902 is illustrated with a visual boundary at a particular value corresponding to a maximum boundary value for the operational parameter (e.g., represented at an end of the value tape 902 at one end), and/or a visual boundary at a particular value corresponding to a minimum boundary value for the operational parameter (e.g., represented at an alternative end of the value tape 902). As illustrated in user interface 900, the value tape 902 includes a visual boundary 912 representing a maximum boundary value for an operational parameter, specifically for a speed operational parameter. In this regard, the user may manipulate the value tape 902 towards a higher value (e.g., via interaction 908 with the indicator 904 in accordance with the direction 910) to reach the value corresponding to the visual boundary 912. The value tape 902 may stop updating in the upwards direction once the visual boundary 912 is fully in view, such that the indicator 904 may only be utilized to update the value tape 902 downward (e.g., towards lower values as depicted) and not past the maximum boundary value.

Example Processes of the Disclosure

Having described example systems, apparatuses, computing environments, interfaces, and data visualizations of the disclosure, example processes in accordance with the present disclosure will now be described. It will be appreciated that each of the flowcharts depicts an example computer-implemented process that is performable by one or more of the apparatuses, systems, devices, and/or computer program products described herein, for example utilizing one or more of the specially configured components thereof.

The blocks depicted indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 10:
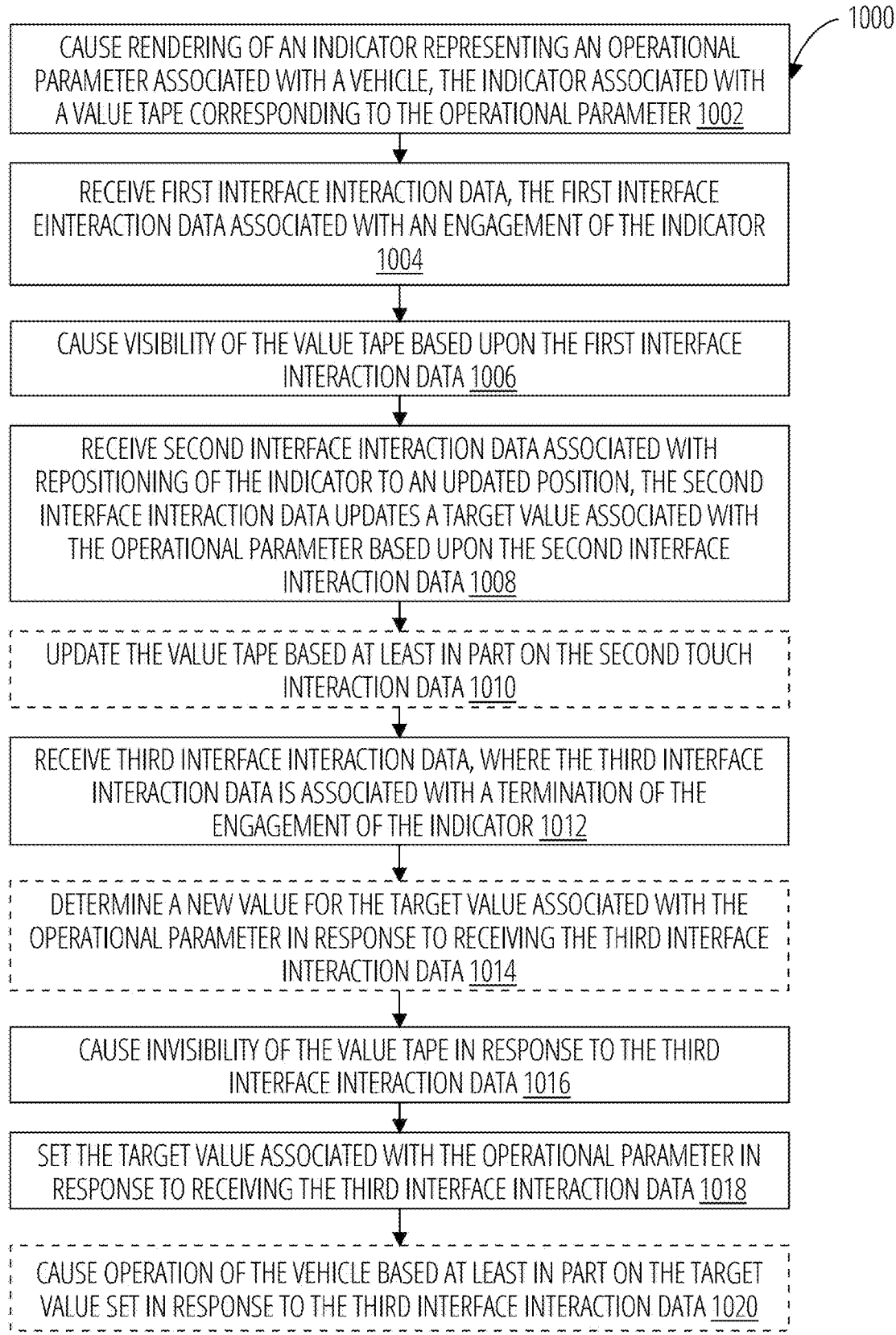
FIG. 10 illustrates a flowchart depicting example operations of an example process for presenting an improved interface in accordance with at least some example embodiments of the present disclosure.

FIG. 10 illustrates a flowchart depicting example operations of an example process for presenting an improved interface in accordance with at least some example embodiments of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the vehicle interfacing apparatus 200 (e.g., embodying a vehicle) alone or in communication with one or more other component(s), device(s), system(s), and/or the like. In this regard, in some embodiments, the vehicle interfacing apparatus 200 is specially configured by the computer-coded instructions (e.g., computer program instructions) stored thereon, for example in the memory 204 and/or another component depicted and/or described herein and/or otherwise accessible to the vehicle interfacing apparatus 200, for performing the operations as depicted and described. In some embodiments, the vehicle interfacing apparatus 200 is in communication with one or more external apparatus(es) system(s), device(s), and/or the like, to perform one or more of the operations as depicted and described. For example, the vehicle interfacing apparatus 200 in some embodiments is in communication with a client device and/or external system. For purposes of simplifying the description, the process 1000 is described as performed by and from the perspective of the vehicle interfacing apparatus 200.

The process 1000 begins at operation 1002. At operation 1002, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to cause rendering of an indicator representing an operational parameter associated with a vehicle, the indicator associated with a value tape corresponding to the operational parameter. In some embodiments, the indicator is rendered to a user interface provided via a display of the vehicle interfacing apparatus 200 or an associated client device. The indicator may be associated with a particular operational parameter. In some embodiments, the indicator is rendered in a default state that depicts or represents (e.g., via a text label) a current value for the operational parameter corresponding to the indicator. In some embodiments, the indicator is rendered at a particular position associated with a central axis of corresponding value tape (e.g., which currently may be set to an invisible state or not rendered). It will be appreciated that the indicator may be rendered in any of a myriad of manners, including different shapes, images, and/or other visual representations with any of a myriad of visual properties.

At operation 1004, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to receive first interface interaction data. In some embodiments, the first interface interaction data engages the indicator. For example, in some embodiments, the first interface interaction data includes a tap, press down, click, other gesture, and/or other input within or associated with an interactable space of the indicator. In some embodiments, the first interface interaction data initiates a continuous interaction, which may similarly be associated with one or more portions of subsequent interface interaction data received at a subsequent time.

At operation 1006, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to cause visibility of the value tape associated with the operational parameter. In some embodiments, the vehicle interfacing apparatus 200 causes visibility of the value tape in response to receiving the first interface interaction data indicating engagement of the indicator. In some embodiments, the vehicle interfacing apparatus 200 causes the value tape to become visible by rendering the value tape via one or more interface(s), for example the interface associated with the corresponding indicator. Alternatively or additionally, in some embodiments, the vehicle interfacing apparatus 200 causes the value tape to become visible by setting a property of the value tape to a first state (e.g., a visibility property to a visible state, an opacity to a visible value, and/or the like).

At operation 1008, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to receive second interface interaction data that repositions the indicator to an updated position. In some embodiments, the second interface interaction data represents a drag from a first position (e.g., indicated or otherwise associated with the first interface interaction data) to a second position associated with the second interface interaction data. In some embodiments, the second interface interaction data represents one or more other gesture(s) for interacting with the value tape by repositioning the indicator in one or more direction(s). In some embodiments, the second interface interaction data directly or indirectly updates a target value associated with the operational parameter based at least in part on the updated position (e.g., by repositioning the indicator, where the indicator's updated position causes an increase or decrease in a value associated with the operational parameter). In some embodiments, the indicator is repositioned along a directional axis associated with the value tape.

In some embodiments, the second interface interaction data updates a target value associated with the operational parameter corresponding to the indicator and/or value tape. The target value in some embodiments is updated based at least in part on the updated position for the indicator. For example, in some embodiments, the target value for the operational parameter is increased at a certain rate based at least in part on an offset between the updated position for the indicator and an initial/default position for the indicator (e.g., where the indicator is located by default, or otherwise at the time the first interface interaction data is received). In one example context, the target value for the operational parameter is increased when the indicator is repositioned in a first direction along a particular axis (e.g., upwards along the value tape, towards the right of the user interface along the value tape, and/or the like). In some embodiments, the target value for the operational parameter is decreased at a certain rate based at least in part on the offset between the updated position for the indicator and the initial/default position for the indicator. In one example context, the target value for the operational parameter is decreased when the indicator is repositioned in a second direction along a particular axis (e.g., downwards along the value tape, towards the left of the user interface along a value tape, and/or the like). In this regard, the second interface interaction data may cause an increase or decrease in the target value for an operational parameter corresponding to the value tape based on the direction in which the indicator is repositioned.

In some embodiments, the interface interaction data indicates a speed at which a user performed an interaction (e.g., a drag or swipe along the tape up or down to reposition the indicator). In some such embodiments, a target value associated with the corresponding operational parameter is updated based on the speed of the interaction. For example, in a circumstance where a user moves their finger downwards at a first rate (e.g., quickly) that is faster than a second rate (e.g., slowly), the target value may update by a greater number corresponding to the first rate than a second number corresponding to the second rate. Any of a myriad of algorithm(s) may be utilized to determine the number by which the target value should be updated based on the speed of a particular interaction, for example as indicated in interface interaction data.

At optional operation 1010, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to update the value tape based at least in part on the second interface interaction data. In some embodiments, the value tape is visually animated towards the direction in which the indicator is repositioned, for example by appearing to spin or roll in the direction towards increased or decreased values. In some embodiments, updating the value tape similarly updates a target value associated with the value tape. For example, in some embodiments, the target value for the value tape is updated at a certain rate based on the offset of the indicator from its initial position. In some embodiments, the value tape may be updated such that the updated target value moves towards a center of the value tape, or until a visual boundary is hit as the value tape updates.

At operation 1012, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to receive third interface interaction data. In some embodiments, the third interface interaction data indicates termination of an engagement of the indicator (e.g., by indicating the indicator has been released from a touch/drag). For example, in some embodiments, the third interface interaction data includes an ending of a touch, an ending of a continuous drag, a particular gesture or input after the first interface interaction data and/or second interface interaction data, and/or the like, associated with the indicator. In some embodiments, the third interface interaction data indicates termination/release of a continuous interaction with the indicator, for example initiated via the first interface interaction data and continuing via one or more second interface interaction data received at a previous time.

At optional operation 1014, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to determine a new value for the target value associated with the operational parameter in response to receiving the third interface interaction data. In some embodiments, the vehicle interfacing apparatus 200 continually determines an updated value for the target value before setting the target value for the operational parameter for an extended period of time (e.g., until next engagement) and/or for further processing. For example, in some embodiments, the determined target value is stored as a temporary value before setting the target value, and may continue to be updated as subsequent interaction data is received (e.g., one or more instances of the second interface interaction data repositioning the indicator). In some embodiments, the target value determined in response to receiving the third interface interaction data represents the final target value to be set for the operational parameter.

At operation 1016, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to cause invisibility of the value tape. In some embodiments, the vehicle interfacing apparatus 200 causes invisibility of the value tape in response to receiving the third interface interaction data releasing the indicator. In some embodiments, the vehicle interfacing apparatus 200 causes the value tape to become invisible by de-rendering the value tape from one or more interface(s), for example the interface associated with the corresponding indicator. Alternatively or additionally, in some embodiments, the vehicle interfacing apparatus 200 causes the value tape to become invisible by setting a property of the value tape to a second state (e.g., a visibility property to an invisible state, an opacity to an invisible value, and/or the like). It will be appreciated that in some embodiments the indicator remains visible such that the user may re-engage the indicator to interact with the corresponding value tape.

At operation 1018, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to set the target value associated with the operational parameter in response to receiving the third interface interaction data. In some embodiments, the vehicle interfacing apparatus 200 stores the target value associated with the operational parameter, for example in the memory 204. The target value may be set as a new target value that replaces a previous target value stored associated with the operational parameter. Alternatively or additionally, in some embodiments, the vehicle interfacing apparatus 200 sets the target value associated with the operational parameter via an associated vehicle control system, for example to cause the vehicle control system to store the updated target value.

At optional operation 1020, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to cause operation of the vehicle based at least in part on the target value. In some embodiments, the vehicle interfacing apparatus 200 controls the vehicle by activating one or more vehicle control system(s) based at least in part on the target value set for a particular operational parameter. In some embodiments, the vehicle control system embodies a separate system of the vehicle, such that the vehicle interfacing apparatus 200 may activate the vehicle control system by setting a parameter of the vehicle control system to the target value. Alternatively or additionally, in some embodiments, the vehicle interfacing apparatus 200 controls the vehicle utilizing an autopilot or other automated control system configured to automatically control operation of the vehicle based at least in part on one or more parameters, such as the operational parameter(s) associated with the vehicle. In some embodiments, the automated control system control(s) one or more component(s) of the vehicle that are associated with the operational parameter, such that the vehicle operates to adjust the current value of the operational parameter towards the target value. In some embodiments, the vehicle interfacing apparatus 200 causes operation of the vehicle in response to receiving the third interface interaction data.

In one example context, the vehicle interfacing apparatus 200 controls a vehicle speed system to adjust a current value for a speed operational parameter towards the target value, for example by activating and/or adjusting operation of an engine, flaps, and/or other vehicle components of the vehicle. In another example context, the vehicle interfacing apparatus 200 controls a vehicle heading system to adjust a current value for a heading operational parameter towards the target value, for example by activating and/or adjusting operation of one or more steering mechanism(s) of the vehicle. In another example context, the vehicle interfacing apparatus 200 controls a vehicle altitude system to adjust a current value for an altitude operational parameter towards the target value, for example by activating and/or adjusting operation of one or more engine(s), rotor(s), and/or the like. It will be appreciated that the vehicle interfacing apparatus 200 may cause operation of any of a myriad of control system(s) to accomplish a particular operational change of the vehicle based on the updated target value for the operational parameter.

Figure 11:
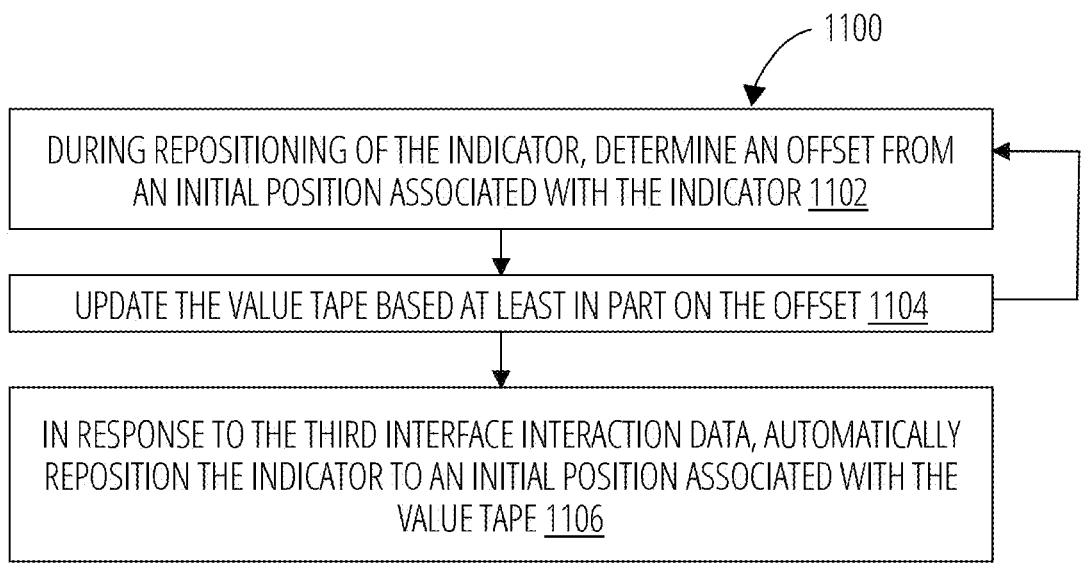
FIG. 11 illustrates a flowchart depicting example operations of an example process for updating elements of an improved interface in accordance with at least some example embodiments of the present disclosure.

FIG. 11 illustrates a flowchart depicting example operations of an example process for updating elements of an improved interface in accordance with at least some example embodiments of the present disclosure. Specifically, FIG. 11 depicts operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the vehicle interfacing apparatus 200 alone or in communication with one or more other component(s), device(s), system(s), and/or the like. In this regard, in some such embodiments, the vehicle interfacing apparatus 200 is specially configured by computer-coded instructions (e.g., computer program instructions) stored thereon, for example in the memory 204 and/or another component depicted and/or described herein and/or otherwise accessible to the vehicle interfacing apparatus 200, for performing the operations as depicted and described. In some embodiments, the vehicle interfacing apparatus 200 is in communication with one or more external apparatus(es), system(s), device(s), and/or the like, to perform one or more of the operations as depicted and described. For purposes of simplifying the description, the process 1100 is described as performed by and from the perspective of the vehicle interfacing apparatus 200.

The process 1100 begins at operation 1102. In some embodiments, the process 1100 begins after one or more operations depicted and/or described with respect to any of the other processes described herein. For example, in some embodiments as depicted, the process 1100 begins after execution of operation 1008. In this regard, some or all of the process 1100 may replace or supplement one or more blocks depicted and/or described with respect to any of the other processes described herein. Upon completion of the process 1100, the flow of operations may terminate. Additionally or alternatively, as depicted, upon completion of the process 1100, flow may return to one or more operations of another process, such as the optional operation 1014. It should be appreciated that, in some embodiments, the process 1100 embodies a subprocess of one or more other process(es), such as the process 1000.

At operation 1102, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to, during repositioning of the indicator, determine an offset from an initial position associated with the indicator. In some embodiments, the vehicle interfacing apparatus 200 stores the initial position of the indicator, and/or retrieves the initial position as a predetermined value. In some embodiments, the initial position associated with the indicator is determined from the first interface interaction data. In some embodiments, the vehicle interfacing apparatus 200 tracks and/or otherwise determines a current position for the indicator as the indicator is repositioned (e.g., in response to second interface interaction data). In some embodiments, the offset is determined as a difference between the current position associated with the indicator and the initial position associated with the indicator (e.g., current position—initial position).

The vehicle interfacing apparatus 200 may determine the current position of the indicator in any of a myriad of manners. In some embodiments, the vehicle interfacing apparatus 200 determines the offset based at least in part on a center position of the indicator. Alternatively or additionally, in some embodiments, the vehicle interfacing apparatus 200 determines the current position of the indicator as corresponding to the top or bottom of the indicator. In some embodiments, the vehicle interfacing apparatus 200 determines the current position of the indicator based on a position extracted or otherwise determined from the first interface interaction data, such as a position of a user interface at which a touch, click, or other interaction was performed. It will be appreciated that the current position associated with the indicator may be determined in any desired manner.

At operation 1104, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to update the value tape based at least in part on the offset. In some embodiments, the value tape is updated to rotate or otherwise animate in a particular manner based on the offset. For example, in some embodiments, the value tape rotates at a particular speed determined based on the offset (e.g., a particular algorithm based on the offset, a lookup table, and/or the like), for example such that the speed of the animation is increased as the value of the offset increases in either a positive or negative direction. In one example context, the vehicle interfacing apparatus 200 updates the value tape by rotating it in a first direction and at a certain animation rate in a circumstance where the offset is positive, and the vehicle interfacing apparatus 200 updates the value tape by rotating it in a second direction and at a certain animation rate in a circumstance where the offset is negative. In some embodiments, the vehicle interfacing apparatus 200 similarly updates a target value associated with the value tape and operational parameter based on the offset, for example where the offset corresponds to a particular rate of change for the target value.

The indicator may continue to be updated any number of times. For example, in some contexts a user interacts with the indicator to continue to reposition the indicator. In this regard, the operations 1102 and 1104 may be repeated any number of times. In some embodiments, the operation 1102 and 1104 is repeated until the third interface interaction data is received.

At operation 1106, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to in response to the third interface interaction data, automatically reposition the indicator to an initial position associated with the value tape. In some embodiments, the indicator is animated from its current position to the initial position over a predetermined time interval or other determinable time interval. In some embodiments, the vehicle interfacing apparatus 200 immediately re-renders the indicator at its initial position. The indicator may be repositioned in parallel with setting the target value, controlling the vehicle interfacing apparatus 200 and/or an associated vehicle, and/or the like.

Figure 12:
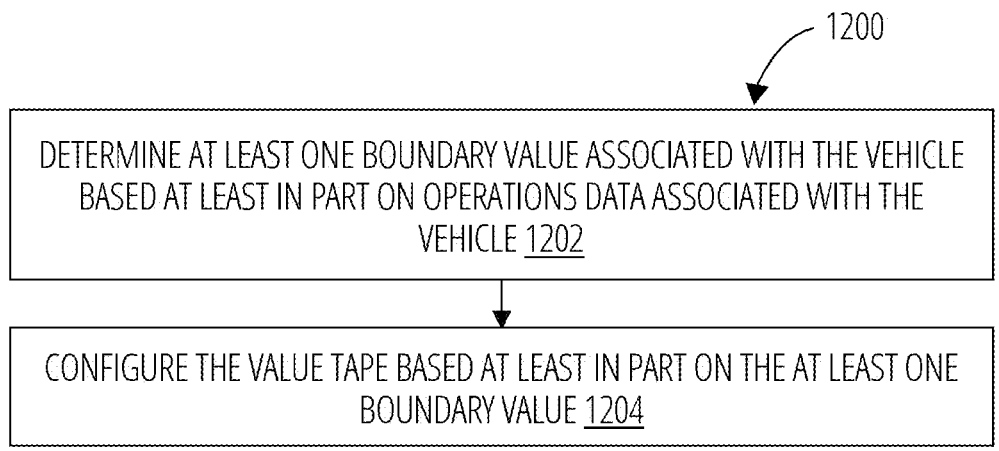
FIG. 12 illustrates a flowchart depicting example operations of an example process for configuring a value tape for presenting via an improved interface in accordance with at least some example embodiments of the present disclosure.

FIG. 12 illustrates a flowchart depicting example operations of an example process for configuring a value tape for presenting via an improved interface in accordance with at least some example embodiments of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the vehicle interfacing apparatus 200 alone or in communication with one or more other component(s), device(s), system(s), and/or the like. In this regard, in some such embodiments, the vehicle interfacing apparatus 200 is specially configured by computer-coded instructions (e.g., computer program instructions) stored thereon, for example in the memory 204 and/or another component depicted and/or described herein and/or otherwise accessible to the vehicle interfacing apparatus 200, for performing the operations as depicted and described. In some embodiments, the vehicle interfacing apparatus 200 is in communication with one or more external apparatus(es), system(s), device(s), and/or the like, to perform one or more of the operations as depicted and described. For purposes of simplifying the description, the process 1200 is described as performed by and from the perspective of the vehicle interfacing apparatus 200.

The process 1200 begins at operation 1202. In some embodiments, the process 1200 begins after one or more operations depicted and/or described with respect to any of the other processes described herein. For example, in some embodiments as depicted, the process 1200 begins after execution of operation 1004. In this regard, some or all of the process 1200 may replace or supplement one or more blocks depicted and/or described with respect to any of the other processes described herein. Upon completion of the process 1100, the flow of operations may terminate. Additionally or alternatively, as depicted, upon completion of the process 1200, flow may return to one or more operations of another process, such as the operation 1006. It should be appreciated that, in some embodiments, the process 1200 embodies a subprocess of one or more other process(es), such as the process 1000.

At operation 1202, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to determine at least one boundary value associated with the vehicle. In some embodiments, the 200 determines the at least one boundary value based at least in part on operations data associated with the vehicle. For example, in some embodiments, the vehicle interfacing apparatus 200 sets a boundary value based on one or more algorithm(s), which may be determinable or statically available to the vehicle interfacing apparatus 200, utilizing the operations data. For example, in some embodiments, the one or more boundary value(s) may represent a minimum value or a maximum value for an operational parameter to control a vehicle within a particular time interval while maintaining safe operation of the vehicle (e.g., preventing a crash, dangerous circumstance for passenger(s), and/or the like). In some embodiments, a boundary value corresponds to data indicated from a regulator, ground system, external control system, and/or user input. Non-limiting examples of a boundary value include a maximum speed, a minimum speed, a maximum altitude, a minimum altitude, and/or a heading boundary corresponding to allowable airspace (e.g., to avoid entering a restricted zone indicated by flight regulators, air traffic control system(s) or personnel, and/or the like)

In some embodiments, the operations data includes sensor data associated with the vehicle. For example, the sensor data may represent environmental data impacting the vehicle (e.g., including or associated with the vehicle interfacing apparatus 200). Additionally or alternatively, in some embodiments, the operations data includes pathing data, flight path data, and/or the like associated with controlling the vehicle in a particular manner. Additionally or alternatively still, in some embodiments, the operations data associated with the vehicle includes regulatory data that represents operational limitation(s) of the vehicle (e.g., minimum and/or maximum speed(s), position limitations for the vehicle such as restrictions on air space, maximum allowable altitude, and/or the like). Additionally or alternatively, in some embodiments, the operations data includes one or more predetermined or static values associated with the vehicle that impact operational safety of the vehicle (e.g., maximum gravitational force above which the operation or structural integrity of the vehicle would be impacted, maximum force above which the operation or structural integrity of the vehicle would be impacted, and/or the like).

At operation 1204, the vehicle interfacing apparatus 200 includes means, such as the visibility management circuitry 210, interaction management circuitry 212, vehicle control circuitry 214, communications circuitry 208, input/output circuitry 206, memory 204, processor 202, and/or the like, or a combination thereof, to configure the value tape based at least in part on the at least one boundary value. In some embodiments, the boundary value is utilized to set a maximum value or minimum value that may be depicted via the value tape. Additionally or alternatively, in some embodiments, the value tape is configured to include a visual boundary located at the boundary value. In this regard, the configured value tape may visually depict the boundary value in a manner that intuitively indicates that the user cannot update the value tape to a value past the boundary value in a particular direction. For example, in some embodiments, the boundary value corresponds to an interface element rendered at a portion of the value tape corresponding to the boundary value, and the value tape is configured to prevent further scrolling/manipulation of the value tape past the boundary value.

CONCLUSION

In some embodiments, some of the operations above may be modified or further amplified. Furthermore, in some embodiments, additional optional operations may be included. Modifications, amplifications, or additions to the operations above may be performed in any order and in any combination.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   causing rendering of an indicator on a display, the indicator representing an operational parameter associated with a vehicle, the indicator associated with a value tape corresponding to the operational parameter;
   receiving first interface interaction data, wherein the first interface interaction data is associated with an engagement of the indicator, and wherein the value tape is invisible when the first interface interaction data is received;
   causing visibility of the value tape in response to receiving the first interface interaction data by rendering the value tape on the display;
   receiving second interface interaction data associated with repositioning of the indicator to an updated position, wherein the second interface interaction data updates a target value associated with the operational parameter based upon the second interface interaction data;
   receiving third interface interaction data, wherein the third interface interaction data is associated with a termination of the engagement of the indicator;
   causing invisibility of the value tape in response to receiving the third interface interaction data; and
   setting the target value associated with the operational parameter in response to receiving the third interface interaction data.

2. The computer-implemented method of claim 1, the computer-implemented method further comprising:
   updating the value tape based at least in part on the second interface interaction data.

3. The computer-implemented method of claim 1, the computer-implemented method further comprising:
   causing operation of the vehicle based at least in part on the target value in response to receiving the third interface interaction data, wherein causing operation of the vehicle based at least in part on the target value in response to receiving the third interface interaction data comprises:
  causing activation of a vehicle heading system to redirect the vehicle from a current value associated with the operational parameter to the target value;
  causing activation of a vehicle altitude system to alter an altitude of the vehicle from a current value associated with the operational parameter to the target value; or
  causing activation of a vehicle speed system to alter a speed of the vehicle from a current value associated with the operational parameter to the target value.

4. The computer-implemented method of claim 1, wherein:
  the value tape is oriented vertically and the second interface interaction data repositions the indicator vertically along the value tape, or
  the value tape is oriented horizontally and the second interface interaction data repositions the indicator horizontally along the value tape.

5. The computer-implemented method of claim 1, wherein the value tape comprises a visual boundary, and wherein the computer-implemented method comprises updating the value tape based at least in part on a distance between the indicator and the visual boundary in response to repositioning of the indicator based at least in part on the second interface interaction data.

6. The computer-implemented method of claim 1, the computer-implemented method further comprising:
  automatically repositioning the indicator to an initial position associated with the value tape.

7. The computer-implemented method of claim 1, the computer-implemented method further comprising:
  during repositioning of the indicator, determining an offset from an initial position associated with the indicator,
  wherein the value tape is updated based at least in part on the offset.

8. The computer-implemented method of claim 1, wherein the second interface interaction data repositions the indicator in a first direction to increase the target value associated with the operational parameter, or wherein the second interface interaction data repositions the indicator in a second direction to decrease the target value associated with the operational parameter.

9. The computer-implemented method of claim 1, wherein the indicator is rendered via a display onboard the vehicle, and wherein the first interface interaction data is received via user interaction with the display onboard the vehicle.

10. The computer-implemented method of claim 1, wherein the display is remote from the vehicle.

11. The computer-implemented method of claim 1, the computer-implemented method further comprising:
  determining at least one boundary value associated with the vehicle based at least in part on operations data associated with the vehicle; and
  configuring the value tape based at least in part on the at least one boundary value.

12. An apparatus comprising:
  at least one processor; and
  at least one memory storing instructions that, when executed by the at least one processor, configure the apparatus to:
  cause rendering of an indicator on a display, the indicator representing an operational parameter associated with a vehicle, the indicator associated with a value tape corresponding to the operational parameter;
  receive first interface interaction data, wherein the first interface interaction data is associated with an engagement of the indicator, and wherein the value tape is invisible when the first interface interaction data is received;
  cause visibility of the value tape in response to receipt of the first interface interaction data by causing rendering of the value tape on the display;
  receive second interface interaction data associated with repositioning of the indicator to an updated position, wherein the second interface interaction data updates a target value associated with the operational parameter based upon the second interface interaction data;
  receive third interface interaction data, wherein the third interface interaction data is associated with a termination of the engagement of the indicator;
  cause invisibility of the value tape in response to receipt of the third interface interaction data; and
  set the target value associated with the operational parameter in response to receiving the third interface interaction data.

13. The apparatus of claim 12, the apparatus further configured to:
  reposition the indicator to an initial position associated with the value tape.

14. The apparatus of claim 12, the apparatus further configured to:
  cause operation of the vehicle based at least in part on the target value in response to receiving the third interface interaction data.

15. A non-transitory computer-readable storage medium, the non-transitory computer-readable storage medium including program instructions that when executed by at least one computer, cause the at least one computer to:
  cause rendering of an indicator on a display, the indicator representing an operational parameter associated with a vehicle, the indicator associated with a value tape corresponding to the operational parameter;
  receive first interface interaction data, wherein the first interface interaction data is associated with an engagement of the indicator, and wherein the value tape is invisible when the first interface interaction data is received;
  cause visibility of the value tape in response to receipt of the first interface interaction data by causing rendering of the value tape on the display;
  receive second interface interaction data associated with repositioning of the indicator to an updated position, wherein the second interface interaction data updates a target value associated with the operational parameter based upon the second interface interaction data;
  receive third interface interaction data, wherein the third interface interaction data is associated with a termination of the engagement of the indicator;
  cause invisibility of the value tape in response to receipt of the third interface interaction data; and
  set the target value associated with the operational parameter in response to receiving the third interface interaction data.

16. The computer-implemented method of claim 1, wherein the causing the invisibility of the value tape is in response to and upon the termination of the engagement of the indicator.

17. The computer-implemented method of claim 1, wherein when the value tape is visible, the value tape depicts a range of possible settable values associated with the operational parameter.

18. The computer-implemented method of claim 1, wherein an environment representation is rendered via the display.

19. The computer-implemented method of claim 1, wherein the engagement of the indicator comprises a user touching the indicator rendered via the display.

20. The computer-implemented method of claim 1, wherein the operational parameter is a speed, heading, altitude, or orientation of the vehicle.

* * * * *